(12) United States Patent
Broyles et al.

(10) Patent No.: US 11,318,920 B2
(45) Date of Patent: May 3, 2022

(54) BRAKE CONTROLLER STORING DECELERATION PROFILES AND METHOD USING DECELERATION PROFILES STORED IN A BRAKE CONTROLLER

(71) Applicant: Bendix Commercial Vehicle Systems LLC, Elyria, OH (US)

(72) Inventors: Nicholas A. Broyles, Elyria, OH (US); Subashish Sasmal, Elyria, OH (US); Thomas S. Miller, Jr., Elyria, OH (US); Andrew L. Kennedy, Elyria, OH (US); Phillip J. Kasper, Elyria, OH (US)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 126 days.

(21) Appl. No.: 16/805,273

(22) Filed: Feb. 28, 2020

(65) Prior Publication Data

US 2021/0269000 A1 Sep. 2, 2021

(51) Int. Cl.
*B60T 8/1761* (2006.01)
*B60W 60/00* (2020.01)
(Continued)

(52) U.S. Cl.
CPC .......... *B60T 8/17616* (2013.01); *B60T 8/329* (2013.01); *B60W 10/18* (2013.01);
(Continued)

(58) Field of Classification Search
CPC .... B60T 8/17616; B60T 8/329; B60W 10/18; B60W 60/0015; B60W 2050/0075; B60W 2556/45
See application file for complete search history.

(56) References Cited

U.S. PATENT DOCUMENTS 5,752,214 A 5/1998 Minowa et al.
6,359,552 B1 * 3/2002 King ...................... G08G 1/161
180/167
(Continued)

FOREIGN PATENT DOCUMENTS

CN 104670191 B 9/2017
CN 107472292 A 3/2019
(Continued)

OTHER PUBLICATIONS

International Search Report and Written Opinion for corresponding International Application No. PCT/US2021/019851, dated May 26, 2021. 22 pages.

*Primary Examiner* — Babar Sarwar
(74) *Attorney, Agent, or Firm* — Tucker Ellis LLP

(57) ABSTRACT

A brake controller in a vehicle determines braking profiles that may be exercised while operating the vehicle in autonomous or semi-autonomous conditions to decelerate the vehicle based on received commands or that may be exercised automatically in the event of a failure in a communication network of the vehicle or in other systems or components of the vehicle. The braking profiles decelerate the vehicle according to a deceleration profile. The execution of the deceleration profile may be initiated by a single command message received by the brake controller or it may be determined by the brake controller based on vehicle information. A safe state deceleration profile may be preselected by the controlling devices before the occurrence of a failure or an emergency situation, and then executed by the brake controller upon the occurrence of a failure or emergency.

19 Claims, 8 Drawing Sheets

(51) Int. Cl.
 *B60T 8/32* (2006.01)
 *B60W 10/18* (2012.01)
 *B60W 50/00* (2006.01)

(52) U.S. Cl.
 CPC . *B60W 60/0015* (2020.02); *B60W 2050/0075* (2013.01); *B60W 2556/45* (2020.02)

(56) References Cited

U.S. PATENT DOCUMENTS

| | | | | |
|---|---|---|---|---|
| 7,400,964 | B2* | 7/2008 | Shiiba | B60K 31/0008 |
| | | | | 701/96 |
| 7,425,043 | B2* | 9/2008 | Doerr | B60Q 9/008 |
| | | | | 303/193 |
| 7,735,610 | B2* | 6/2010 | Huard | B61B 12/10 |
| | | | | 187/288 |
| 8,532,902 | B2* | 9/2013 | Bentner | B60T 7/042 |
| | | | | 701/76 |
| 8,775,047 | B2* | 7/2014 | Breuer | B60T 8/4818 |
| | | | | 701/70 |
| 8,825,331 | B2* | 9/2014 | Muranaka | B60T 8/321 |
| | | | | 701/70 |
| 9,067,573 | B2* | 6/2015 | Matoy | B60T 7/22 |
| 9,216,721 | B2* | 12/2015 | Eckert | B60T 8/1755 |
| 9,650,038 | B2* | 5/2017 | Yoshimura | B60W 10/20 |
| 2011/0190972 | A1* | 8/2011 | Timmons | G08G 1/166 |
| | | | | 701/31.4 |
| 2012/0176234 | A1* | 7/2012 | Taneyhill | B60W 10/06 |
| | | | | 340/453 |
| 2014/0025270 | A1 | 1/2014 | Kosanam et al. | |
| 2015/0012196 | A1* | 1/2015 | Matoy | B60T 8/1755 |
| | | | | 701/70 |
| 2017/0106869 | A1* | 4/2017 | Lavoie | B60W 10/18 |
| 2017/0160745 | A1* | 6/2017 | Lauffer | G08G 1/096791 |
| 2018/0143633 | A1* | 5/2018 | Paryani | H04L 12/40013 |
| 2018/0215272 | A1* | 8/2018 | Vitullo | B60T 1/10 |
| 2018/0215359 | A1* | 8/2018 | Eckert | B60T 7/22 |
| 2020/0175782 | A1* | 6/2020 | Tokman | G07C 5/085 |

FOREIGN PATENT DOCUMENTS

| | | |
|---|---|---|
| DE | 3632962 C1 | 2/1988 |
| EP | 2186699 A1 | 8/2011 |
| EP | 3260336 A1 | 12/2017 |
| JP | S59227546 A | 12/1984 |
| JP | 2005297621 A | 8/2010 |
| WO | 2011055470 A1 | 5/2011 |
| WO | 2018142104 A1 | 8/2018 |
| WO | 2017/232316 A1 | 12/2019 |

\* cited by examiner

BRAKE CONTROLLER STORING DECELERATION PROFILES AND METHOD USING DECELERATION PROFILES STORED IN A BRAKE CONTROLLER

TECHNICAL FIELD

The embodiments herein relate generally to vehicle braking. More specifically, particular embodiments relate to brake controllers in vehicles storing one or more braking profiles that may be exercised while operating in autonomous or semi-autonomous conditions to decelerate the vehicle based on received commands or that may be exercised automatically in the event of a failure in a communication network of the vehicle or in other systems or components of the vehicle. Although the embodiments will be described with reference to commercial highway vehicles having an electronic brake controller in communication with one or more External Brake Request (XBR) controlling devices via a Controller Area Network (CAN) bus, it is to be appreciated that the claimed invention is also amenable to other applications and can equivalently be extended to other embodiments and environments such as for example automobiles.

BACKGROUND

Modern vehicles including for example construction vehicles, agricultural tractors, commercial highway vehicles, and many other similar work vehicles are now typically controlled using multiple individual electronic controllers that are arranged at suitable locations throughout the vehicle, and that are in operative communication with various sensor devices disposed at or locally near to the various operations that are performed relative to the vehicle.

Example operations include a tire pressure monitoring operation performed by a Tire Pressure Monitoring System (TPMS) device using one or more pressure sensors at the tires, anti-lock braking operations performed by an Antilock Braking System (ABS) device using Wheel Speed Sensors (WSS) disposed near the wheels, traction control performed by an Automatic Traction Control (ATC) controller device, interfacing with the driver of the vehicle performed by one or more Driver Interface Units (DIUs) using display and input devices disposed in the cab of the vehicle, braking operations performed by a brake Electronic Control Unit (ECU), automatic emergency braking operations performed by an Automatic Emergency Braking System (AEBS), automatic cruise control operations performed by an Automatic Cruise Control (ACC) system, image recording operations performed by a camera of a CAMERA system, and radar imaging operations performed by a RADAR system.

As mentioned above, the multiple individual electronic controllers that are arranged at suitable locations throughout the vehicle may be in operative communication using a communication and control network such as for example a CAN bus. At times when the vehicle is operated in an autonomous or in a semi-autonomous mode, a brake controller may perform deceleration operations in response to XBR deceleration demands that are received by the brake controller via the CAN bus from one or more XBR controlling devices on the CAN bus. Typical XBR controlling device include, for example, the AEBS and ACC devices mentioned above, and also may include an Automated Vehicle Controller (AVC) on the CAN bus sending XBR deceleration and other demands, to name a few.

The XBR deceleration demands for the brake controller to perform the deceleration operations are typically communicated separately from each of the XBR controlling devices to the brake controller via the CAN bus as single XBR deceleration demand messages having particular commanded deceleration levels embedded within the demand message. Currently, the XBR deceleration demand messages are sent to the brake controller in an open loop manner. That is, each of the XBR deceleration demand messages are sent separately onto the CAN bus as may be needed by the XBR controlling devices, but without the brake controller providing any feedback to the respective XBR controlling device confirming that the brake controller received their particular XBR deceleration demand. Given the open loop nature of the brake command protocol of these systems, the XBR controlling device might continue to send XBR deceleration demand messages without knowledge that earlier XBR deceleration demands were acted upon by the brake controller. In addition, adapting the XBR controlling device to re-send a XBR deceleration demand message that might not have been received by the brake controller is not a feasible solution for providing closed loop brake command feedback.

Also, in some cases, more than one XBR controlling device may send XBR deceleration demand messages onto the bus at substantially the same time and having different particular commanded deceleration levels. Since brake controllers currently available do not have an ability to arbitrate between the different particular commanded deceleration levels, they can only act on the commanded deceleration level contained in the most recently received XBR deceleration demand message. Therefore, braking control is in effect rewarded to the XBR controlling device sending the most recent last XBR deceleration demand message, potentially to the disadvantage to other XBR controlling devices sending other XBR deceleration demand messages.

In some cases such as for example during an emergency braking need there may be a desire for an XBR controlling device such as for example an AEBS to send one or more tailored or specialized sets of XBR deceleration demands having a series of different particular commanded deceleration levels for controlling the brake controller to follow a desired emergency deceleration profile. However, given the open loop nature of the brake command protocol of these systems, there is no way for the XBR controlling device to confirm receipt by the brake controller of a first emergency deceleration command before sending the second emergency deceleration command, etc. The XBR controlling device simply sends out onto the CAN bus a series of XBR braking commands in accordance with a desired braking profile generated by the XBR controlling device. Also given the open loop nature of the brake command protocol of these systems, a bus or other communication failure may result in the XBR deceleration demand message stream representative of the desired brake command profile being cut off and therefore possibly resulting in the full deceleration demand set prevented from being fully delivered to the brake controller.

In addition and owing to congestion of other messages on the CAN bus including messages not necessarily relating the braking commands, loading on the communication network may occur to the point where XBR deceleration demand messages may experience a significant communication lag relative to their need for quick delivery. This may cause a disturbance in delivery fidelity of the XBR deceleration demands contained in XBR deceleration demand messages, and the timing of their respective executions, relative to the deceleration profile desired by the XBR controlling device.

In further addition, damage or failure may occur to one or more of the various sensor devices disposed at or locally near to the various operations that are performed by the vehicle. These sensors may be needed however by the XBR controlling device to develop desired XBR deceleration demands in accordance with feedback of various physical properties that would otherwise be provided by the failed or damaged sensor. For example, a wheel speed sensor failure or a failure of a modulator might frustrate the development by the XBR controlling device of a suitable XBR deceleration demand for delivery during the relevant time window to the brake controller.

It is therefore desirable to provide a brake controller system storing a plurality of deceleration profiles in a memory local to the brake controller for selection and automatic execution of a stored deceleration profile by the brake controller based on an XBR deceleration profile selection signal received by the brake controller from an XBR controlling device.

It is further desirable to provide a brake controller system storing a plurality of safe state deceleration profiles in a memory local to the brake controller for selection and queueing or staging the selected safe state profile by the brake controller in response to the brake controller receiving a safe state deceleration profile selection signal from an XBR controlling device, and for automatically executing the selected and queued or staged safe state deceleration profile at an appropriate time in response to the brake controller receiving a predetermined trigger signal indicating a fault in the vehicle.

It is therefore also further desirable to provide a brake controller system storing a plurality of safe state deceleration profiles in a memory local to the brake controller for automatic selection and execution of a stored safe state deceleration profile by the brake controller based on vehicle information relating to operational parameters of the vehicle and in response to the brake controller determining that there is a fault in the vehicle or in response to receiving a predetermined trigger signal from an XBR controlling device indicating a fault. In an embodiment the information relating to the operational parameters of the vehicle may include one or more of a level of XBR controlled braking, a current speed of the vehicle, a distance to the forward vehicle, ABS/WSS health, a forward velocity relative to a vehicle forward to the vehicle of the brake controller 250, a current level of ABS activity, ADAS health, ESP activity, or other values and/or parameters as may be desired or necessary.

SUMMARY OF THE EXAMPLE EMBODIMENTS

The embodiments herein provide for a new and improved brake controller storing a plurality of deceleration profiles in a memory local to the brake controller for selection and automatic execution of a stored deceleration profile by the brake controller based on an XBR deceleration profile selection signal received by the brake controller from an XBR controlling device.

The embodiments herein further provide for a new and improved brake controller storing a plurality of safe state deceleration profiles in a memory local to the brake controller for selection and queueing or staging of a selected safe state profile by the brake controller in response to the brake controller receiving a safe state deceleration profile selection signal from an XBR controlling device, and for automatically executing the selected and queued or staged safe state deceleration profile at an appropriate time in response to the brake controller determining that there is a fault in the vehicle and/or by the brake controller receiving a predetermined trigger signal indicating a fault in the vehicle.

The embodiments herein still further provide for a new and improved brake controller storing a plurality of safe state deceleration profiles in a memory local to the brake controller for automatic selection and execution of a stored safe state profile by the brake controller based on vehicle information relating to operational parameters of the vehicle and in response to the brake controller receiving a predetermined trigger signal indicating a fault in the vehicle and/or responsive to the brake controller determining a fault in the vehicle. In an embodiment the information relating to the operational parameters of the vehicle may include one or more of a level of XBR controlled braking, a current speed of the vehicle, a distance to the forward vehicle, ABS/WSS health, a forward velocity relative to a vehicle forward to the vehicle of the brake controller, a current level of ABS activity, ADAS health, ESP activity, or other values and/or parameters as may be desired or necessary.

The embodiments herein still further provide for a new and improved brake controller including brake control logic stored in a memory device and that is executable by a processor to, responsive to a braking system fault logic network interface unit determining a fault condition in a vehicle, determine, based on operational information of the vehicle determined by vehicle information logic, a safe state braking control profile comprising safe state braking control profile data representative of a safe state braking control profile value for decelerating the associated vehicle. The brake control logic is executable by a processor further to communicate the safe state braking control profile data of the safe state braking control profile to an output circuit as a deceleration command data, wherein the output circuit generates a brake command signal corresponding to the safe state braking control profile value on the output circuit for use by a braking system of the vehicle to effectuate a braking operation in accordance with the determined safe state braking control profile. The operational information may include a current level of XBR controlled braking, a current speed of the vehicle, a distance to the forward vehicle, ABS/WSS health, a forward velocity relative to a vehicle forward to the vehicle of the brake controller, a current level of ABS activity, ADAS health, and/or ESP activity as the operational information of the vehicle.

The embodiments herein still further provide for a new and improved brake controller including brake control logic stored in a memory device and that is executable by a processor to after communicating the safe state braking control profile data of the safe state braking control profile to the output circuit as the deceleration command data, based on a value of a second operational information of the vehicle determined by the vehicle information logic, selectively communicate safe state braking control profile termination data representative of a deceleration termination command value for terminating deceleration of the associated vehicle to the output circuit as deceleration command data, wherein the output circuit generates a null brake command signal corresponding to the deceleration termination command value on the output circuit for use by the braking system of the associated vehicle to terminate the braking operation. In an example, embodiment, the second operational information of the vehicle for terminating the braking operation may be one or more of: a reduction in speed of the associated vehicle relative to a predetermined speed reduction threshold; a speed of the associated vehicle relative to a predetermined vehicle speed threshold; a driver override of the brake controller; a distance to an associated forward vehicle forward of the associated vehicle relative to a predetermined forward distance threshold; and/or a magnitude of relative velocity between the associated vehicle and the associated forward vehicle relative to a predetermined relative velocity threshold.

Other embodiments, features and advantages of the example embodiments for automatically triggering deceleration profiles stored in a breaking controller will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF THE EXAMPLE EMBODIMENTS

In the following description reference is made to the accompanying figures which form a part thereof, and in which is shown, by way of illustration, one or more example embodiments of the disclosed brake controller system storing deceleration profiles and methods using deceleration profiles stored in a brake controller. Various modifications of the example embodiments may be contemplated by on of skill in the art.

Figure 1:
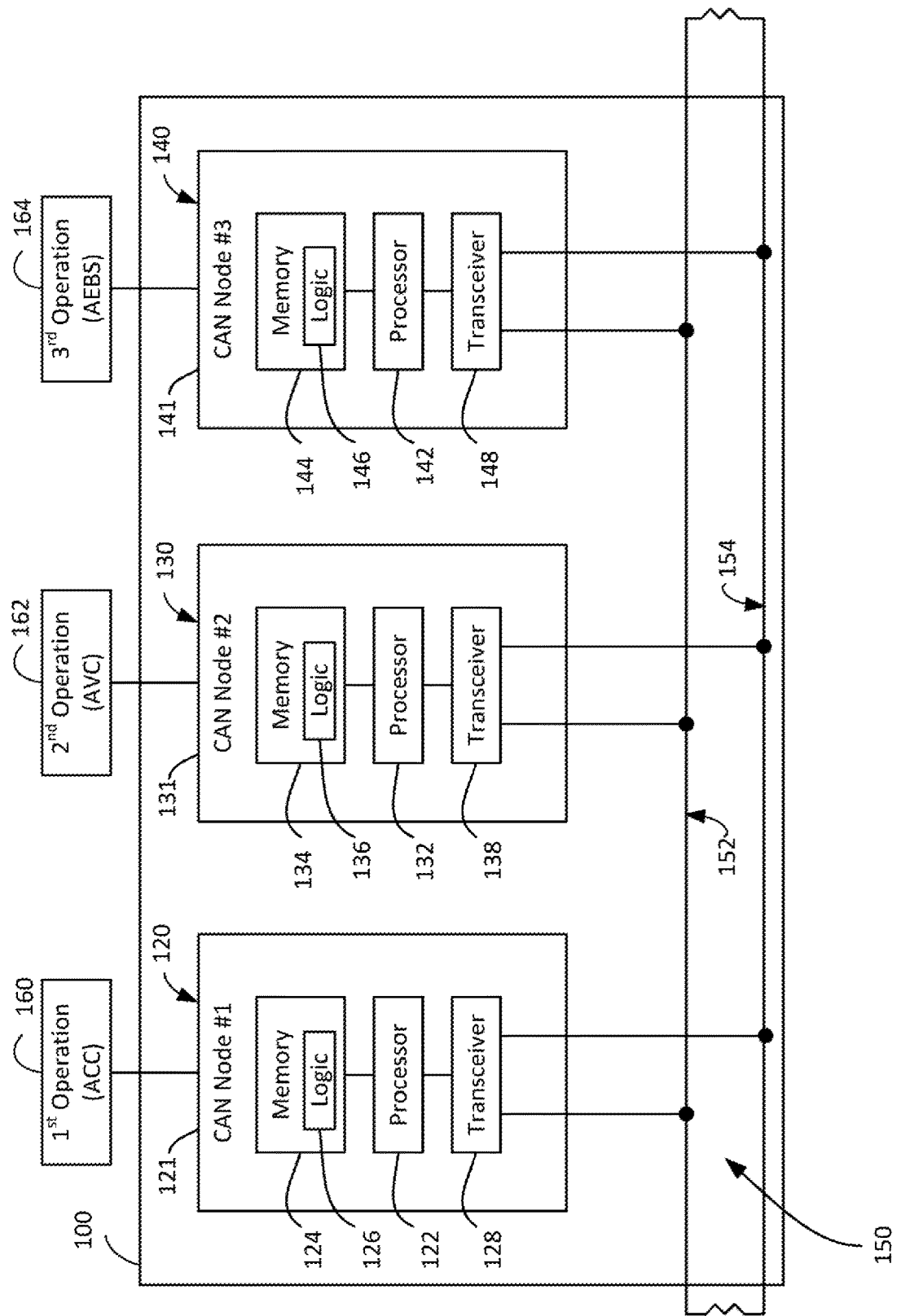
FIG. 1 depicts a CAN network that includes multiple CAN nodes mutually connected with a CAN bus.

Referring now to the drawings, wherein the showings are only for the purpose of illustrating the example embodiments only and not for purposes of limiting the same, FIG. 1 is a simplified depiction of Controller Area Network (CAN) 100 that includes multiple CAN nodes 120, 130, 140 in accordance with an example embodiment. The CAN nodes may also be referred to herein as Electronic Control Units (ECUs), CAN devices, CAN controllers, or the like. Each of the CAN nodes 120, 130, 140 is connected with a CAN bus 150. In addition, each of the CAN nodes includes a processor, a memory, device, and a transceiver. In the example illustrated, the first CAN node 120 includes a first processor 122 operatively coupled with a first memory device 124 which may store logic 126 that is executable by the processor and which may also store data for use by the processor while executing the logic to carry out one or more particular function(s) and/or protocol(s) for effecting control over a first operation 160 of an associated vehicle, device, apparatus, machine or the like in which the CAN network 100 is disposed. The logic 126 may include operation control logic that is executable by the first processor 122 to control the first operation 160 of the associated vehicle based on a first operation command message received by the first CAN device 120 from the CAN bus 150 via the first CAN transceiver 128. The logic 126 may further include operation status reporting logic that is executable by the first processor 122 to determine values of one or more operational signals of the first operation 160, generate first operation status CAN messages comprising first operation data representative of the values of the one or more operational signals of the first operation 160, and transmit the first operation status CAN messages via the first CAN transceiver 128 to the CAN bus 150.

In the example embodiments described in the present disclosure, the CAN network 100 may be disposed in a large road vehicle such as a commercial truck including a tractor towing one or more towed units as a combination vehicle, for example. The first CAN node 120 may be an Automatic Cruise Control (ACC) control unit 121 for controlling an ACC operation 160 in the commercial truck as the first operation, for example. The first CAN node 120 in the example show in in FIG. 1 includes a first transceiver device 128 disposed between the first processor 122 and the CAN bus 150 for implementing a physical layer connection between the first processor 122 and the CAN bus 150.

Also in the example illustrated, the second CAN node 130 includes a second processor 132 operatively coupled with a second memory device 134 which may store logic that is executable by the second processor and to also store data for use by the second processor while executing the logic to carry out one or more particular function(s) and/or protocol(s) for effecting control over a further operation 162 of the associated vehicle such as a commercial truck, for example. The second CAN node 130 may be an Automated Vehicle Controller (AVC) system 131 for controlling an automated vehicle operation of the commercial truck as the second operation 162 for example. The AVC system 131 may control various functions of the vehicle during autonomous operation such as for example to control vehicle during participation in platooning operations with other similarly equipped vehicles on the roadway. The second CAN node 130 in the example shown also includes a second transceiver device 138 disposed between the second processor 132 and the CAN bus 150 for implementing a physical layer connection between the second processor 132 and the CAN bus 150.

Similar to the first CAN device 120, the logic 136 of the second CAN device 130 may include operation control logic that is executable by the second processor 132 to control the second operation 162 of the associated vehicle based on a second operation command message received by the second CAN device 130 from the CAN bus 150 via the second CAN transceiver 138. The logic 136 may further include operation status reporting logic that is executable by the second processor 132 to determine values of one or more operational signals of the second operation 162, generate second operation status CAN messages comprising second operation data representative of the values of the one or more operational signals of the second operation 162, and transmit the second operation status CAN messages via the second CAN transceiver 138 to the CAN bus 150.

Yet further in the example illustrated, the third CAN node 140 includes a third processor 142 operatively coupled with a third memory device 144 which may store logic that is executable by the third processor and data for use by the third processor while executing the logic to carry out one or more particular function(s) and/or protocol(s) for effecting control over yet a further operation 164 of the associated vehicle such as a commercial truck, for example. The third CAN node 140 may be an AEBS control unit 141 for controlling an AEBS operation of the vehicle as the third operation for example. The third CAN node 140 in the example show also includes a third transceiver device 148 disposed between the third processor 142 and the CAN bus 150 for implementing a physical layer connection between the third processor 142 and the CAN bus 150.

Similar to the first and second CAN devices 120, 130, the logic 146 of the third CAN device 140 may include operation control logic that is executable by the third processor 142 to control the third operation 164 of the associated vehicle based on a third operation command message received by the third CAN device 140 from the CAN bus 150 via the third CAN transceiver 148. The logic 146 may further include operation status reporting logic that is executable by the third processor 142 to determine values of one or more operational signals of the third operation 164, generate third operation status CAN messages comprising third operation data representative of the values of the one or more operational signals of the third operation 164, and transmit the third operation status CAN messages via the third CAN transceiver 148 to the CAN bus 150.

It is to be appreciated that the processors 122, 132, 142 may be any form of controller, micro-controller or the like, and that the CAN nodes 120, 130, 140 are typically connected with at least one other device (not shown) such as, for example, one or more sensor(s), one or more actuator(s), or some other control device. In addition and in accordance with the descriptions herein, the term "computer-readable medium" as may be used herein refers to any non-transitory media that stores and/or otherwise participates in providing instructions to the processors 122, 132, 142 for execution. Such a non-transitory medium may take many forms, including but not limited to volatile and non-volatile media. Non-volatile media includes, for example, memory devices, optical or magnetic disks, or the like. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures and claims, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The CAN bus 150 of the example embodiment illustrated in FIG. 1 carries analog differential signals and includes a CAN high (CANH) bus line 152 and a CAN low (CANL) bus line 154. The CAN bus 150 is known in the art.

Figure 2:
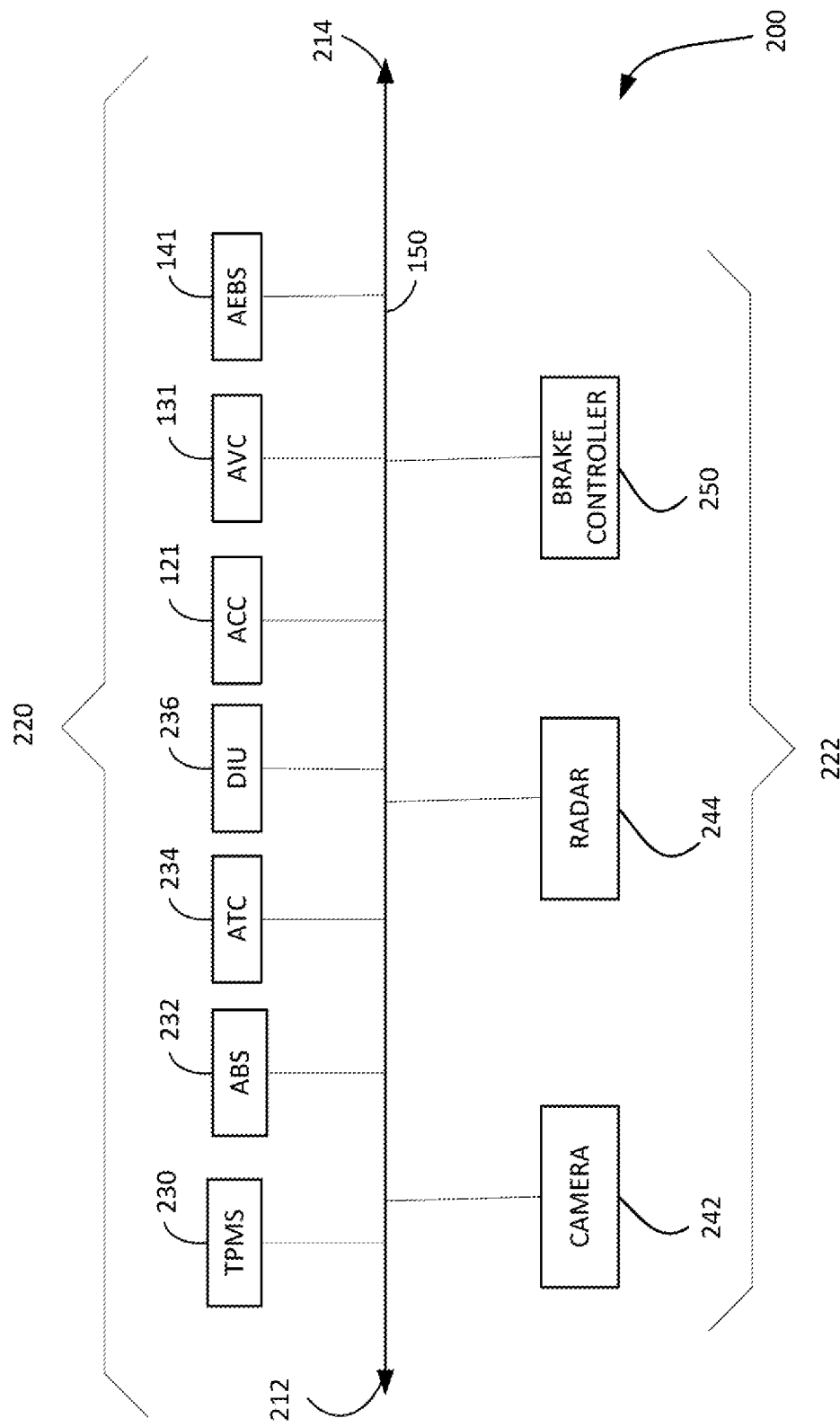
FIG. 2 depicts a CAN network applied in an associated vehicle in accordance with an example embodiment that includes a CAN bus connecting multiple CAN devices controlling various operations of the associated vehicle.

FIG. 2 depicts a CAN network 200 applied in an associated vehicle such as applied for example in a commercial truck including a tractor towing one or more towed units as a combination vehicle, for example. The CAN network 200 as applied in accordance with an example embodiment includes a CAN bus 150 connecting multiple sets of CAN devices 220, 222. Each of the sets of multiple CAN devices 220, 222 are formed similar to the nodes 120, 130, 140 (FIG. 1) and accordingly each includes a network interface unit or device such as a transceiver for example for coupling the CAN device with the CAN bus 150, a processor, a memory storing logic that is executable by the processor for controlling various operations of the associated vehicle, and one or more input and output circuits for physically interfacing with aspects of the various operations of the associated vehicle such as for example wheel speed sensor devices, etc. The CAN bus 150 has first and second plugs 212, 214 for connection to further extensions of the CAN bus 150 with one or more CAN bus extensions as may be necessary or desired.

The multiple sets of CAN devices 220, 222 may include in the illustrated example a TPMS control unit 230 performing tire pressure monitoring of the tires of the commercial truck using one or more pressure sensors at the tires. The multiple sets of CAN devices 220, 222 may further include an ABS control unit 232 performing anti-lock braking operations using Wheel Speed Sensors (WSS) disposed near the wheels, and an ATC unit 234 performing automatic traction control. In the example illustrated, the ABS unit 232 may include for example a CAN node similar to those shown in FIG. 1 together with one or more sensor and/or actuator devices disposed in or at the wheels of the combination vehicle. The multiple sets of CAN devices 220, 222 may further include a DIU control unit 236 used to receive signals from an operator via the CAN network 200 for controlling the associated vehicle as may be necessary or desired. The DIU unit 236 is provided in the operator's cab of the associated vehicle and includes logic that is executable by a processor for providing a visual monitor that may be used by the operator while operating the work vehicle from within its cab. The multiple sets of CAN devices 220, 222 may still further include a CAMERA control unit 242 for performing image recording operations, and a RADAR control unit 244 for performing radar imaging operations such as for example to detect other vehicles near to the commercial vehicle.

An ACC control unit 121 of the type described above is provided for performing automatic cruise control operations. In addition, an AVC controller 131 is provided for controlling various functions of the vehicle during autonomous operation of the vehicle such as for example during platooning. In further addition, an AEBS control unit 141 of the type described above is provided in the first set 220 of CAN devices for performing automatic emergency braking operations. In the example illustrated, the ACC control unit 121 may include for example the first CAN node 120 shown in FIG. 1 together with one or more sensor and/or actuator devices disposed in or at the first operation 160. Also in the example illustrated, the AVC control unit 131 may include for example the second CAN node 130 shown in FIG. 1 together with one or more sensor and/or actuator devices disposed in or at the second operation 162. Still also in the example illustrated, the AEBS control unit 141 may include for example the third CAN node 140 shown in FIG. 1 together with one or more sensor and/or actuator devices disposed in or at the third operation 164.

The multiple sets of CAN devices 220, 222 may further include a mechatronic brake controller 250 provided for performing braking operations in accordance with example embodiments. The brake controller 250 is formed similar to the nodes 120, 130, 140 (FIG. 1) and accordingly similarly includes a network interface unit or device such as a transceiver for example for coupling the brake controller 250 with the CAN bus 150, a processor, a memory storing logic that is executable by the processor for controlling various operations of the associated vehicle such as for example the braking functions, and one or more input and output circuits for physically interfacing with aspects of the various operations of the associated vehicle such as for example wheel speed sensor devices, etc.

In an example embodiment, the brake controller 250 stores a plurality of deceleration profiles in a memory local to the brake controller for selection and automatic execution of a stored deceleration profile by the brake controller based on an XBR deceleration profile selection signal received by the brake controller from an XBR controlling device such as for example XBR deceleration profile selection signals received from the AVC 131 during autonomous and/or semi-autonomous vehicle operations.

In a further example embodiment, the brake controller 250 stores a plurality of safe state deceleration profiles in a memory local to the brake controller for selection and queueing or staging of a selected safe state profile by the brake controller in response to the brake controller receiving a safe state deceleration profile selection signal from an XBR controlling device such as the AVC 131, and for automatically executing the selected and queued or staged safe state deceleration profile at an appropriate time during autonomous and/or semi-autonomous vehicle operations in response to the brake controller receiving a predetermined trigger signal indicating a fault in the vehicle and/or responsive to the brake controller determining a fault in the vehicle. In an embodiment, braking system fault logic stored in a memory device of the brake controller is executable by the processor of the brake controller to determine the fault in the associated vehicle. The fault information may be derived from the CAN bus as well in further embodiments.

In accordance with an embodiment, a fault in the associated vehicle may be determined by the brake controller based on XBR message faults such as for example, from CAN bus messages missing for a period of time, invalid value(s) contained in the messages, checksums indicating that a message was not transmitted correctly, out the like. Further, a fault in the associated vehicle may be determined by the brake controller based on issues with or in other controllers in the vehicle network such as for example, a broadcast of a DM1 or other fault message on the CAN bus. Still further, a fault in the associated vehicle may be determined by the brake controller based on an internal fault of the brake controller such as for example, an open or shorted wire or any other brake controller mal or other condition.

In yet a further example embodiment, the brake controller 250 stores a plurality of safe state deceleration profiles in a memory local to the brake controller for automatic selection and execution of a stored safe state profile by the brake controller during autonomous and/or semi-autonomous vehicle operations based on vehicle information relating to operational parameters of the vehicle and in response to the brake controller receiving a predetermined trigger signal indicating a fault in the vehicle and/or responsive to the brake controller determining a fault in the vehicle. In an embodiment, braking system fault logic stored in a memory device of the brake controller is executable by the processor of the brake controller to determine the fault in the associated vehicle. The fault information may be derived from the CAN bus as well in further embodiments.

In an embodiment the information relating to the operational parameters of the vehicle may include one or more of a level of XBR controlled braking, a current speed of the vehicle, a distance to the forward vehicle, ABS/WSS health, a forward velocity relative to a vehicle forward to the vehicle of the brake controller 250, a current level of ABS activity, ADAS health, ESP activity, or other values and/or parameters as may be desired or necessary.

Figure 3:
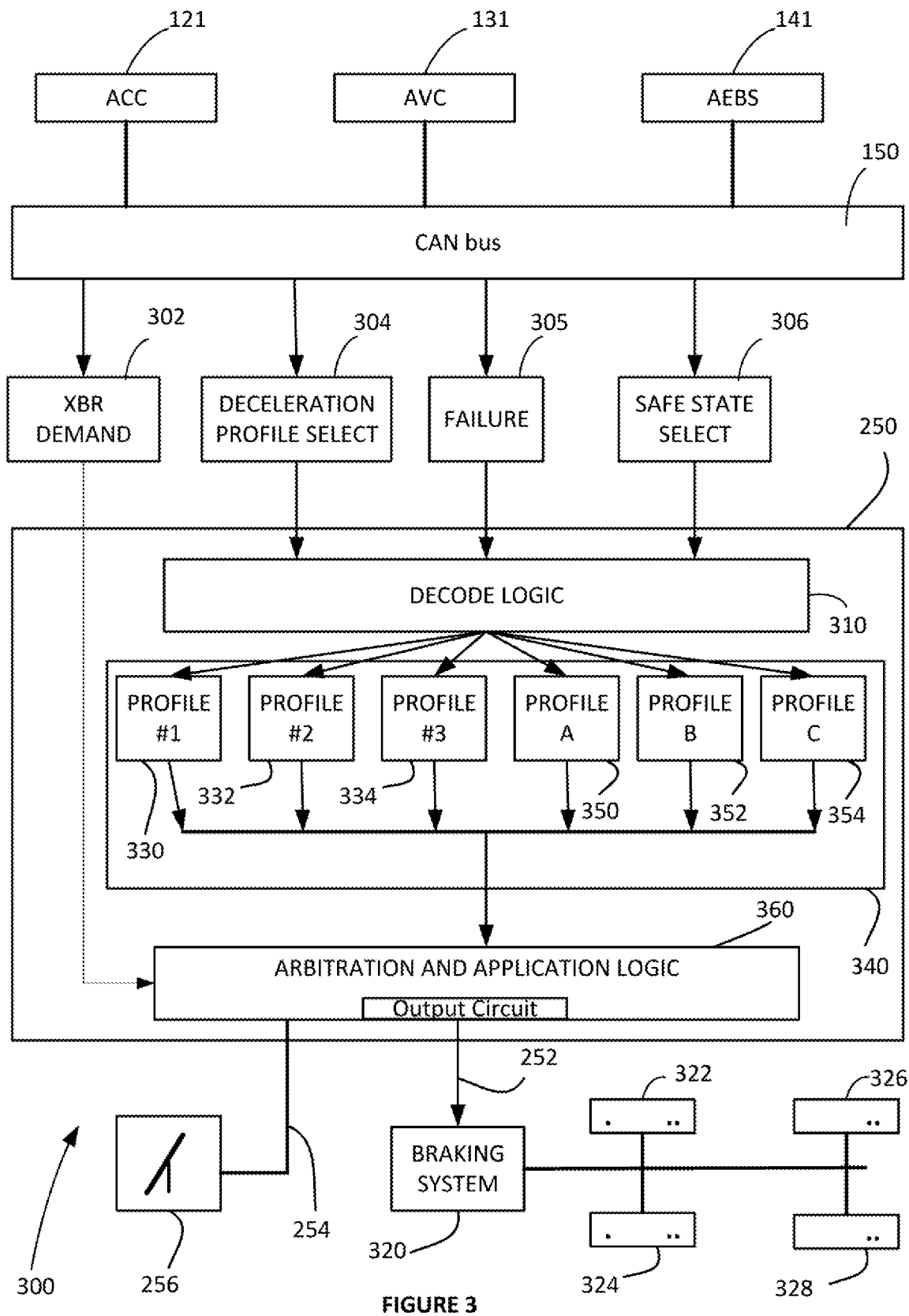
FIG. 3 is a functional schematic of a vehicle braking control system including a brake controller in accordance with an example embodiment.

FIG. 3 is a functional schematic of a vehicle braking control system 300 including a brake controller 250 in accordance with an example embodiment. Although the example embodiments are described herein with reference to commercial highway vehicles having an electronic brake controller 250 in communication with one or more XBR controlling devices such as an ACC control unit 121, and AVC control unit 131, and an AEBS control unit 141 via a CAN bus 150 for automatically executing stored deceleration profiles during autonomous and/or semi-autonomous vehicle operations, it is to be appreciated that the example embodiments are also amenable to other applications and can equivalently be extended to other embodiments and environments such as for example automobiles or any form of automated or autonomous vehicle wherein XBR controlling devices may command and control the vehicle during the autonomous and/or semi-autonomous operations.

Other and/or addition XBR controlling devices may be used in the vehicle braking control system 300 of the example embodiment as may be necessary or desired. For example, any of the control units shown and described above in connection with the system shown in FIG. 2, and any other type of control unit, could serve to operate as an XBR controlling device in accordance with the embodiments by delivering XBR deceleration demand messages to the brake controller 250 via the CAN bus 150.

The example embodiments relate generally to braking methods and apparatus and, more specifically, to a brake controller 250 having a memory 340 storing one or more autonomous mode deceleration profiles 330, 332, 334 that may be automatically exercised while operating an associated vehicle in autonomous or in semi-autonomous conditions such as for example during platooning operations to decelerate the vehicle according to a predetermined sequence of deceleration signals or commands set by the profile stored in the memory 340. The execution of the predetermined sequence of deceleration signals or commands set by the profile are initiated by a single command message received by the brake controller 250 from one or more of the XBR selecting devices such as for example the ACC control unit 121, the AVC control unit 131, and/or the AEBS control unit 141 selecting one of autonomous mode deceleration profiles 330, 332, 334 via the CAN bus 150. The memory 340 of the brake controller 250 also stores one or more safe state deceleration profiles 350, 352, 354 that may similarly be preselected by one or more of the XBR selecting devices and then automatically triggered for execution in the event of a failure in a communication network of the vehicle or in the event of a failure determined in other systems or components of the vehicle rather than being executed based on commands received from the XBR controlling devices. The one or more safe state deceleration profiles 350, 352, 354 may also be both automatically selected and automatically exercised based on vehicle information in the event of a failure in a communication network of the vehicle or in the event of a failure determined in other systems or components of the vehicle rather than based on commands received from the XBR controlling devices.

Direct Braking Control—XBR Deceleration Demand Messages

Each of the XBR controlling devices 121, 131, 141 may directly control braking operations of the vehicle during the autonomous or semi-autonomous conditions to decelerate the vehicle by communicating XBR deceleration demand messages 302 to the brake controller 250 via the CAN bus 150 for processing of XBR deceleration demand data contained in the XBR deceleration demand messages 302 by logic stored in a memory of the controller 250 and executable by a processor of the controller 250, and for delivery by arbitration and application logic 360 executing in the brake controller 250 to a braking system mechatronic control unit MCU 320 of the associated vehicle. The braking system MCU 320 of the associated vehicle may then apply the braking signals 252 received from the brake controller 250 using electromechanical and/or hydraulic mechanisms and/or devices to brake mechanisms 322, 324, 326, 328 of the associated vehicle for performing the deceleration in accordance with the received XBR deceleration demand messages 302.

Direct Manual Braking Control—Foot Pedal

As an example of the direct control of the braking operations of the vehicle during the autonomous or semi-autonomous conditions, the ACC XBR controlling device 121 may develop and send XBR deceleration demand messages 302 to the brake controller 250 via the CAN bus 150 for controlling an automatic cruise control operation 160 (FIG. 1) of the vehicle for example.

The braking system MCU 320 of the associated vehicle is also responsive during non-autonomous and non-semi-autonomous conditions to a manual deceleration signal 254 received from a suitable switch in an operator feedback sensor such as a seat switch (not shown) that generates an occupant present signal when the operator is physically correctly seated behind the steering wheel, or a brake pedal 256 of the associated vehicle for performing the deceleration in accordance with manual commands received from the operation using the brake pedal. The manual deceleration signal 254 may also be used by the arbitration and application logic 360 executing in the brake controller 250 to override other XBR demand signals 304, 306 as may be necessary or desired. The arbitration and application logic 360 executing in the brake controller 250 may refer to priority assignments and to other factors and variables relative to the operation of the vehicle for situations when XBR controlling devices request different braking profiles in competition with the brake pedal. The brake controller 250 may then deliver the selected one of the plurality braking profiles 330-334 and 350-354 or the manual deceleration signal 254 to the braking system MCU 320 of the associated vehicle. The braking system MCU 320 of the associated vehicle may then apply the braking signals received from the brake controller 250 to brake mechanisms 322, 324, 326, 328 of the associated vehicle.

Automatic Braking Control—Activation of Stored Deceleration Profile by Deceleration Profile Selection Signal In an embodiment, the brake controller system 300 stores autonomous mode deceleration profiles 330, 332, 334 that may be exercised by brake controller 250 upon the one or more XBR controlling devices 130, 160, 164 sending an autonomous mode XBR deceleration profile selection message 304 via the CAN bus 150. The autonomous mode XBR deceleration profile selection messages 304 represent an XBR deceleration profile selection signal and include autonomous mode deceleration profile selection data representative of a deceleration profile desired by the requesting XBR controlling device, wherein the autonomous mode deceleration profile selection data is used by the decode logic 310 of the brake controller 250 to select a particular stored autonomous mode deceleration profile 330, 332, or 334 for activation by the brake controller to automatically decelerate the vehicle based on the activated selected profile 330, 332, or 334 without the need for any further intervention by the requesting XBR controlling device to control the deceleration of the associated vehicle. In that way, a single autonomous mode deceleration profile selection message sent by any of the XBR controlling devices in the vehicle braking control system 300 results in a fully controlled deceleration of the associated vehicle following a tailored deceleration versus time braking protocol as specified by the selected autonomous mode deceleration profile 330, 332, or 334. This eliminates the need for closed loop feedback of braking commands, and also helps to reduce traffic on the CAN bus.

In the example embodiment, each of the autonomous mode deceleration profiles specifies a set of deceleration data paired with execution time data comprising a first plurality of deceleration data representative of a first plurality of deceleration values paired with a first plurality of execution time increment data representative of a first plurality of execution time increments to be followed by the brake controller 250 for generating brake signals 252 to be sent to a braking system Mechatronic Control Unit MCU 320 of the associated vehicle. In an embodiment, a brake controller is provided for controlling a braking operation of a braking system of an associated vehicle in response to External Brake Request (XBR) deceleration demands received from an associated XBR controlling device. The brake controller includes a network interface unit in operative communication with the associated XBR controlling device via an associated control network of the associated vehicle, the network interface unit selectively receiving a first XBR deceleration profile selection message from the associated XBR controlling device via the associated control network; an output circuit operatively coupled with a braking system of the associated vehicle, the output circuit being operative to receive deceleration command data representative of a deceleration command value and to generate a brake command signal corresponding to the deceleration command value on an output of the output circuit for use by the braking system of the associated vehicle to effectuate the braking operation at the deceleration command value; and a brake control unit operatively coupled with the network interface unit and the output circuit. In one form, the brake control unit comprises a processor, a memory device storing a first braking control profile comprising first deceleration profile data representative of a first deceleration profile value, and brake control logic stored in the memory device. The brake control logic is executable by the processor to, responsive to the network interface unit receiving the first XBR deceleration profile selection message: decode the first XBR deceleration profile selection message to determine a first braking profile selection signal selecting the first braking control profile by the first XBR deceleration profile selection message, and communicate the first deceleration profile data to the output circuit as the deceleration command data, wherein the output circuit generates the brake command signal corresponding to the first deceleration profile value for use by the braking system of the associated vehicle to effectuate the braking operation in accordance with the first braking control profile.

In an embodiment, the first braking control profile stored in the memory device of the brake controller comprises ramp-in data representative of a maximum rate of deceleration change for initiating the first braking control profile by the brake control logic relative to a braking control currently being executed by the brake control logic, wherein the brake control logic communicates the first deceleration data to the output circuit as the deceleration command data by adjusting the braking control currently being executed in increments of the ramp-in data, communicating the adjusted braking control currently being executed to the output circuit as the deceleration command data until the adjusted braking control currently being executed matches the first deceleration data, then communicating the second deceleration data to the output circuit as the deceleration command data.

In an embodiment, the first braking control profile stored in the memory device of the brake control unit comprises a first set of deceleration data paired with execution time data comprising a first plurality of deceleration data representative of a first plurality of deceleration values paired with a first plurality of execution time increment data representative of a first plurality of execution time increments. The brake control logic stored in the memory device of the brake control unit is executable by the processor to, responsive to the network interface unit receiving the first XBR deceleration profile selection message communicate the first deceleration data to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

In an embodiment, the memory device of the brake control unit stores a second braking control profile comprising a second set of deceleration data paired with execution time data comprising a second plurality of deceleration data representative of a second plurality of deceleration values paired with a second plurality of execution time increment data representative of a second plurality of execution time increments. The brake control logic is executable by the processor to, responsive to the network interface unit receiving a second XBR deceleration profile selection message decode the second XBR deceleration profile selection message to determine a second braking profile selection signal selecting the second braking control profile by the second deceleration trigger message; and communicate the second deceleration data to the output circuit as the deceleration command data by communicating the second plurality of deceleration data at the second plurality of execution time increments, wherein the output circuit generates the brake command signal corresponding to the second plurality of deceleration values at the second plurality of execution time increments on the output circuit for use by the braking system of the associated vehicle to effectuate the braking operation in accordance with the second braking control profile.

In an embodiment, the first braking control profile stored in the memory device comprises a first priority value, the second braking control profile stored in the memory device comprises a second priority value, the memory device of the brake control unit stores arbitration logic executable by the processor to determine a rank between the first and second priority values, and the brake control logic is executable by the processor to: responsive to the arbitration logic determining the first priority value being ranked above the second priority value, communicate the first deceleration data to the output circuit as the deceleration command data, or responsive to the arbitration logic determining the second priority value being ranked above the first priority value, communicate the second deceleration data to the output circuit as the deceleration command data.

Figure 4:
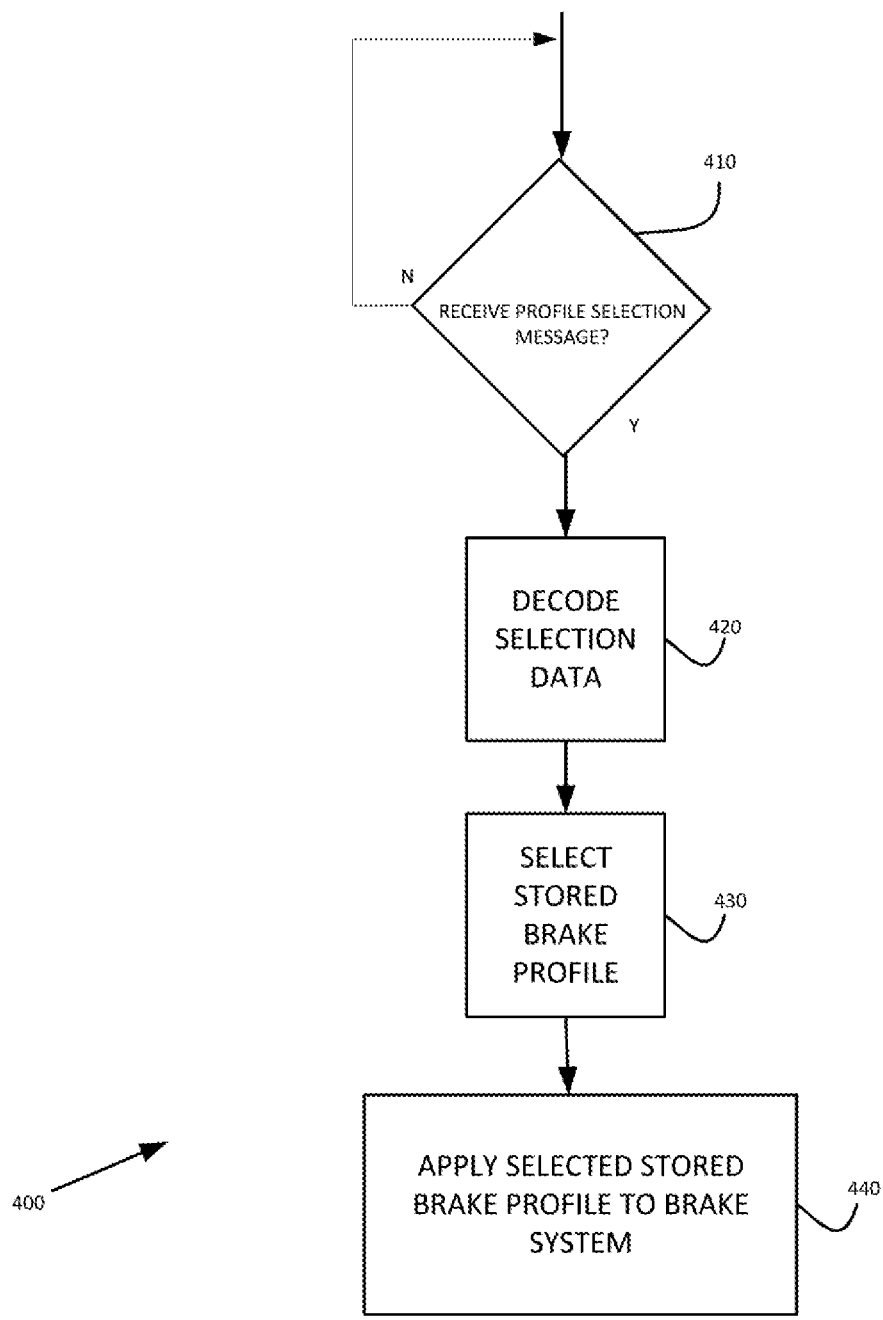
FIG. 4 is a flow diagram of a method using deceleration profiles stored in a brake controller in accordance with an example embodiment.

FIG. 4 is a flow diagram of a method 400 using deceleration profiles stored in a brake controller in accordance with an example embodiments. With reference now to that Figure, a processor of the brake controller 250 executes logic to determine whether and autonomous mode XBR deceleration profile selection message 304 is received. If no such message is received, the method waits until such message is received before proceeding.

If an autonomous mode XBR deceleration profile selection message 304 is received in step 410, the autonomous mode XBR deceleration profile selection data is decoded in step 420 by the decode logic 310 executed by the processor.

Next, at step 430, a brake profile is selected from among the autonomous mode deceleration profiles 330, 332, 334 in accordance with the decoded autonomous mode XBR deceleration profile selection data.

At step 440, the selected brake profile is applied to the braking system MCU 320 of the associated vehicle.

Safe State Braking Profile Selected/Staged/Queued by XBR Controlling Devices Before Fault Detection/Determination for Deferred Activation of Autonomous Mode Deceleration Profile In a further example embodiment, one or more of the safe state deceleration profiles 350, 352, 354 are preselected by one or more of the XBR controlling devices based on a safe state profile selection command received from the one or more of the XBR controlling devices before the occurrence of a failure or an emergency situation, and then executed by the brake controller 250 upon the occurrence of a failure, emergency, fault in the vehicle, or the like. In an embodiment, braking system fault logic stored in a memory device of the brake controller is executable by the processor of the brake controller to determine the fault in the associated vehicle. The fault information may be derived from the CAN bus as well in further embodiments.

In the example embodiment, the safe state deceleration profiles 350, 352, 354 are preselected before the occurrence of the failure or the emergency situation by one or more of the XBR controlling devices, and queued or otherwise staged in the memory ready for later quick execution during the autonomous and/or semi-autonomous vehicle operations and when and if the failure, fault, and/or the emergency situation actually occurs.

The memory 340 of the brake controller system 300 stores safe state deceleration profiles 350, 352, 354 that may be selected and then staged or queued to be automatically exercised in the event of an emergency or a failure in a communication network of the vehicle or in other systems or components of the vehicle. A safe state deceleration profile 350, 352, 354 is presented or otherwise queued or staged for execution based on safe state profile selection data contained in safe state profile selection messages 306 received by the brake controller 250 before the occurrence of a failure or an emergency situation. The queued deceleration profile is then executed by the brake controller 250 based on a received signal representative of a failure or an emergency situation, rather than based on commands received from the XBR controlling devices as described above in connection with activation of autonomous mode deceleration profile by trigger message selection. An indication of a failure or an emergency situation may be delivered to the brake controller 250 in data contained in a failure message 305 from the CAN bus 150, for example. In the example embodiment, the safe state deceleration profiles 350, 352, 354 are preselected before the occurrence of the failure or the emergency situation by one or more of the XBR controlling devices, and are queued or otherwise staged in the memory ready for later quick execution when and if the failure or the emergency situation actually occurs.

The autonomous mode safe state profile selection message 306 includes autonomous mode safe state profile selection data representative of a deceleration profile desired by the requesting XBR controlling device, wherein the autonomous mode safe state profile selection data is used by the decode logic 310 of the brake controller 250 to select a particular stored autonomous mode safe state profile selection profile for activation by the brake controller to automatically decelerate the vehicle based on the activated selected profile 350, 352, 354 after receiving notification of the failure data contained in a failure message 305 from the CAN bus 150, without the need for any further intervention by the requesting XBR controlling device to control the deceleration of the associated vehicle. In that way, a single safe state deceleration message sent by any of the XBR controlling devices in the vehicle braking control system 300 results in a fully controlled deceleration of the associated vehicle following a tailored braking protocol as specified by the selected autonomous mode safe state profile 350, 352, or 354. This eliminates the need for closed loop feedback of braking commands, and also helps to reduce traffic on the CAN bus. In addition, there may be some scenarios where XBR braking may need to be continued if the brake ECU loses communication with the source ECUs or some Brake ECU Faults. Examples of these conditions would include, for example, a communication bus disconnection and/or corruption, forward collision in which the radar 244 (FIG. 1) is destroyed, Safe State reaction for autonomous driving, ESP Sensor Fault (SAS, YAS), or WSS or Modulator Failure.

Overall, exercise or activation of the one or more safe state deceleration profiles 350, 352, 354 stored in the memory 340 of the brake controller 250 is deferred until such time as a failure or other emergency situation occurs such as for example after receiving a failure message 305 indicating a failure in a communication network of the vehicle or in other systems or components of the vehicle rather than being immediately exercised activated based on commands received from the XBR controlling devices. In a further embodiment, braking system fault logic stored in a memory device of the brake controller is executable by the processor of the brake controller to determine the fault in the associated vehicle. The fault information may be derived from both the CAN bus as well in further embodiments as from the braking system fault logic. The deferred exercise or activation of the one or more safe state deceleration profiles 350, 352, 354 stored in the memory 340 of the brake controller 250 is based on a safe state profile selection command received before the occurrence of a failure or an emergency situation.

In the example embodiment, a safe state deceleration profile 350, 352, 354 is preselected before the occurrence of the failure or the emergency situation by one or more of the XBR controlling devices, and queued or otherwise staged in the memory ready for later quick execution when and if the failure or the emergency situation actually occurs.

In the example embodiment, each of the safe state deceleration profiles specifies a set of deceleration data paired with execution time data comprising a first plurality of deceleration data representative of a first plurality of deceleration values paired with a first plurality of execution time increment data representative of a first plurality of execution time increments to be followed by the brake controller 250 for generating brake signals 252 to be sent to a braking system Mechatronic Control Unit MCU 320 of the associated vehicle.

In an embodiment, a brake controller is provided for controlling a braking operation of a braking system of an associated vehicle in response to External Brake Request (XBR) deceleration demands received from an associated XBR controlling device. The brake controller includes a network interface unit in operative communication with the associated XBR controlling device via an associated control network of the associated vehicle, the network interface unit selectively receiving a first safe state deceleration profile selection message from the associated XBR controlling device via the associated control network. The brake controller further includes an output circuit operatively coupled with a braking system of the associated vehicle, the output circuit being operative to receive deceleration command data representative of a deceleration command value and to generate a brake command signal corresponding to the deceleration command value on an output of the output circuit for use by the braking system of the associated vehicle to effectuate the braking operation at the deceleration command value. The brake controller further includes a brake control unit operatively coupled with the network interface unit and the output circuit. The brake control unit of an example embodiment includes a memory device, a processor, and braking system fault and brake control logic. The memory device stores a first safe state braking control profile comprising first safe state braking control profile data representative of a first safe state braking control profile value. The braking system fault logic stored in the memory device is executable by the processor to determine a fault in the associated vehicle. The brake control logic stored in the memory device is executable by the processor to, responsive to the network interface unit receiving the first safe state deceleration profile selection message: decode the first safe state deceleration profile selection message to determine a first safe state braking profile selection signal selecting the first safe state braking control profile by the first safe state deceleration profile selection message; and queue in the memory device the first safe state braking control profile selected by the first safe state braking profile selection signal. In the example embodiment, the brake control logic is operable to: responsive to the braking system fault logic determining the fault in the associated vehicle, communicate the first deceleration data of the first safe state braking control profile queued in the memory device to the output circuit as the deceleration command data, wherein the output circuit generates the brake command signal corresponding to the first safe state braking control profile value on the output circuit for use by the braking system of the associated vehicle to effectuate the braking operation in accordance with the first safe state braking control profile.

In an example embodiment, the first braking control profile stored in the memory device comprises ramp-in data representative of a maximum rate of deceleration change for initiating the first braking control profile by the brake control logic relative to a braking control currently being executed by the brake control logic. In the example embodiment, the brake control logic communicates the first deceleration data to the output circuit as the deceleration command data by adjusting the braking control currently being executed in increments of the ramp-in data, communicating the adjusted braking control currently being executed to the output circuit as the deceleration command data until the adjusted braking control currently being executed matches the first deceleration data, then communicating the second deceleration data to the output circuit as the deceleration command data.

In an example embodiment, the first safe state braking control profile stored in the memory device of the brake control unit comprises a first set of deceleration data paired with execution time data comprising: a first plurality of deceleration data representative of a first plurality of deceleration values paired with a first plurality of execution time increment data representative of a first plurality of execution time increments. In the example embodiment, the brake control logic stored in the memory device of the brake control unit is operable to: responsive to the braking system fault logic determining the fault in the associated vehicle, communicate the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

In an example embodiment, the memory device of the brake control unit stores a second braking control profile comprising a second set of deceleration data paired with execution time data comprising: a second plurality of deceleration data representative of a second plurality of deceleration values paired with a second plurality of execution time increment data representative of a second plurality of execution time increments. In the example embodiment, the brake control logic is executable by the processor to, responsive to the network interface unit receiving a second safe state deceleration profile selection message: decode the second safe state deceleration profile selection message to determine a second braking profile selection signal selecting the second braking control profile by the second deceleration trigger message; and communicate the second deceleration data to the output circuit as the deceleration command data by communicating the second plurality of deceleration data at the second plurality of execution time increments, wherein the output circuit generates the brake command signal corresponding to the second plurality of deceleration values at the second plurality of execution time increments on the output circuit for use by the braking system of the associated vehicle to effectuate the braking operation in accordance with the second braking control profile.

In an example embodiment, the first braking control profile stored in the memory device comprises a first priority value, the second braking control profile stored in the memory device comprises a second priority value, the memory device of the brake control unit stores arbitration logic executable by the processor to determine a rank between the first and second priority values, and the brake control logic is executable by the processor to: responsive to the arbitration logic determining the first priority value being ranked above the second priority value, communicate the first deceleration data to the output circuit as the deceleration command data, or responsive to the arbitration logic determining the second priority value being ranked above the first priority value, communicate the second deceleration data to the output circuit as the deceleration command data.

Figure 5:
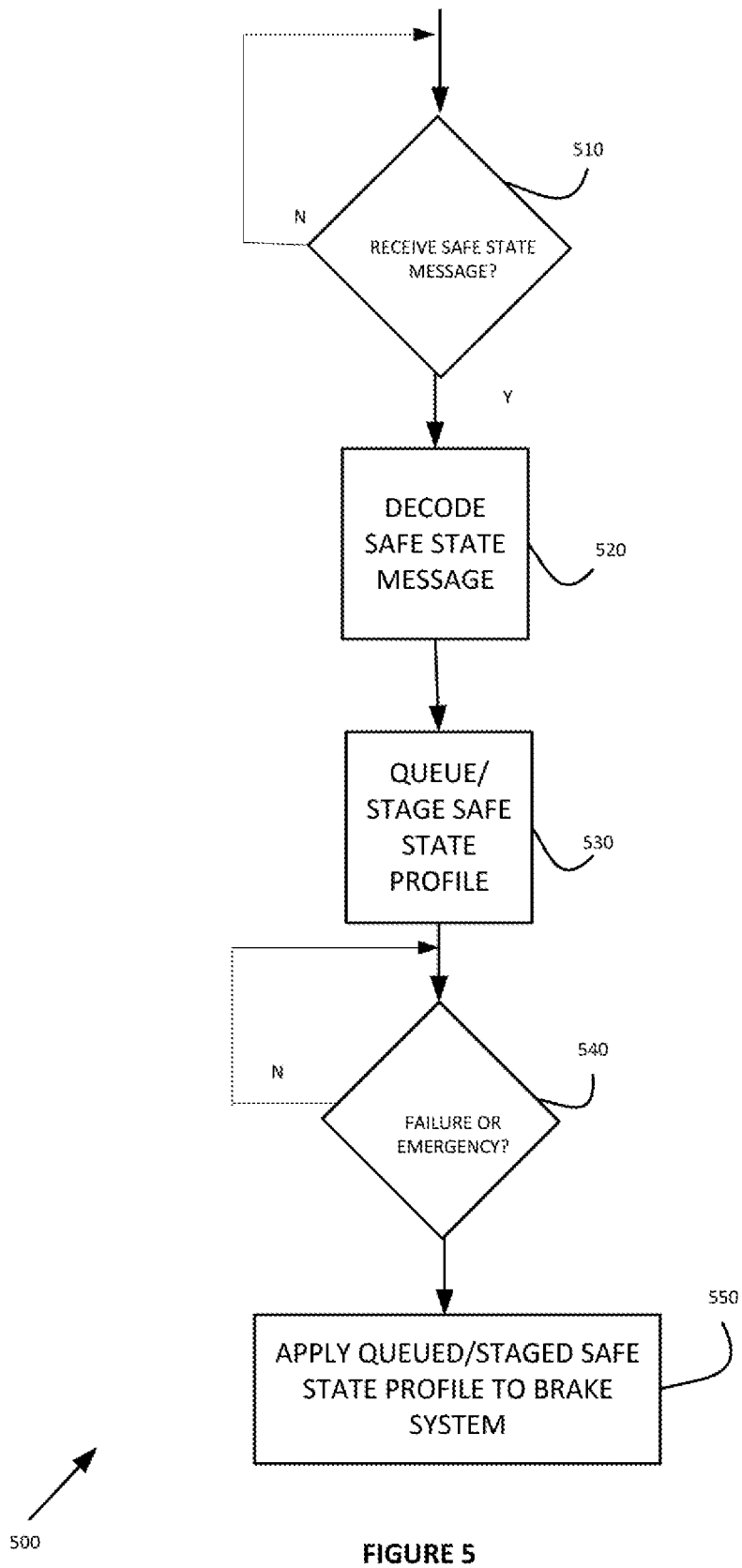
FIG. 5 is a flow diagram of a method using deceleration profiles stored in a brake controller in accordance with an example embodiment.

FIG. 5 is a flow diagram of a method 500 using deceleration profiles stored in a brake controller in accordance with an example embodiments. With reference now to that Figure, a processor of the brake controller 250 executes logic to determine whether and autonomous mode safe state message 306 is received. If no such message is received, the method waits until such message is received before proceeding.

If an autonomous mode safe state message is received in step 510, the safe state data is decoded in step 520 by the decode logic 310 executed by the processor.

Next, at step 530, a safe state brake profile is selected from among the autonomous mode safe state deceleration profiles 350, 352, 354 for queuing or otherwise staging for later execution in the event of an emergency and/or a failure in the system such as for example a communication failure or the like.

At step 540 it is determined whether an emergency and/or a failure has in the system such as for example a communication failure or the like. This step may for example include receiving a failure message 305 from the CAN bus 150 and determining whether the failure message 305 includes failure data representative of the emergency and/or a failure. Overall, exercise or activation of the one or more safe state deceleration profiles 350, 352, 354 stored in the memory 340 of the brake controller 250 is deferred until such time as a failure or other emergency situation occurs such as for example after receiving a failure message 305 indicating a failure in a communication network of the vehicle or in other systems or components of the vehicle rather than being immediately exercised activated based on commands received from the XBR controlling devices. In a further embodiment, braking system fault logic stored in a memory device of the brake controller is executable by the processor of the brake controller to determine the fault in the associated vehicle. The fault information may be derived from both the CAN bus as well in further embodiments as from the braking system fault logic. The deferred exercise or activation of the one or more safe state deceleration profiles 350, 352, 354 stored in the memory 340 of the brake controller 250 is based on a safe state profile selection command received before the occurrence of a failure or an emergency situation.

At step 550, the selected queued or otherwise staged autonomous mode safe state deceleration profile is applied to the braking system 320 of the associated vehicle.

Safe State Braking Profile Automatically Selected and/or Determined Locally by Braking Controller and Executed by Braking Controller Based on Vehicle Information In a further example embodiment, one or more of the safe state deceleration profiles 350, 352, 354 are automatically selected and/or determined locally by the brake controller 250 based on vehicle status data representative of vehicle information values present at a time that a fault such as a CAN bus fault or the like for example is determined by fault detecting logic of the braking controller 250, and/or by the brake controller 250 receiving a failure message 305 indicating a failure in a communication network of the vehicle or in other systems or components of the vehicle. In this example embodiment, the brake controller 250 may automatically select and execute one of the safe state deceleration profiles 350, 352, 354 based on the occurrence of the fault such as a CAN bus fault and also based on the vehicle status data. In an example embodiment, one or more safe state deceleration profiles other than the set of previously stored safe state deceleration profiles 350, 352, 354 are automatically determined locally by the brake controller 250 based on operational information of the associated vehicle including for example one or more of a current level of XBR controlled braking, a current speed of the vehicle, a distance to the forward vehicle, ABS/WSS health, a forward velocity relative to a vehicle forward to the vehicle of the brake controller, a current level of ABS activity, ADAS health, and/or ESP activity.

In addition, the selected deceleration profile 350, 352, 354 and/or the profile determined locally by the brake controller 250 based on operational information of the associated vehicle may be terminated in response to one or more predetermined conditions such as for example based on second operational information of the associated vehicle one or more of: a reduction in speed of the associated vehicle relative to a predetermined speed reduction threshold; a speed of the associated vehicle relative to a predetermined vehicle speed threshold; a driver override of the brake controller; a distance to an associated forward vehicle forward of the associated vehicle relative to a predetermined forward distance threshold; and/or a magnitude of relative velocity between the associated vehicle and the associated forward vehicle relative to a predetermined relative velocity threshold.

In a further example embodiment, one or more of the safe state deceleration profiles 350, 352, 354 are selected locally by the brake controller or a deceleration profile is determined locally by the brake controller 250 based on vehicle status data representative of a present level of XBR controlled braking occurring at a time that a fault such as a CAN bus fault is determined by the braking controller 250. In this example embodiment, the brake controller 250 may select one of the safe state deceleration profiles 350, 352, 354 based on the occurrence of a fault such as a CAN bus fault and also based on the present level of XBR controlled braking occurring and/or may determine the profile locally based on operational information of the associated vehicle including for example one or more of a current level of XBR controlled braking, a current speed of the vehicle, a distance to the forward vehicle, ABS/WSS health, a forward velocity relative to a vehicle forward to the vehicle of the brake controller, a current level of ABS activity, ADAS health, and/or ESP activity.

In still yet another example embodiment, one or more of the safe state deceleration profiles 350, 352, 354 are selected locally by the brake controller 250 based on vehicle status data representative of vehicle information values present at a time that a fault such as a CAN bus fault for example is determined by fault detecting logic of the braking controller 250, wherein the vehicle status data may be representative of and may include any one or more of a level of XBR controlled braking, a current speed of the vehicle, a distance to the forward vehicle, ABS/WSS health, a forward velocity relative to a vehicle forward to the vehicle of the brake controller 250, a current level of ABS activity, ADAS health, ESP activity, or other values and/or parameters as may be desired or necessary. In this example embodiment, the brake controller 250 may select one of the safe state deceleration profiles 350, 352, 354 based on the occurrence of a fault such as a CAN bus fault and also based on the vehicle status data representative of a comprehensive set of numerous operations of the vehicle.

In accordance with these example embodiments, the safe state deceleration profiles 350, 352, 354 are not preselected by one or more of the XBR controlling devices before the occurrence of the failure or the emergency situation, but instead are automatically selected locally by the brake controller 250 based on current operations of the vehicle such as for example a current level of XBR braking.

Figure 6:
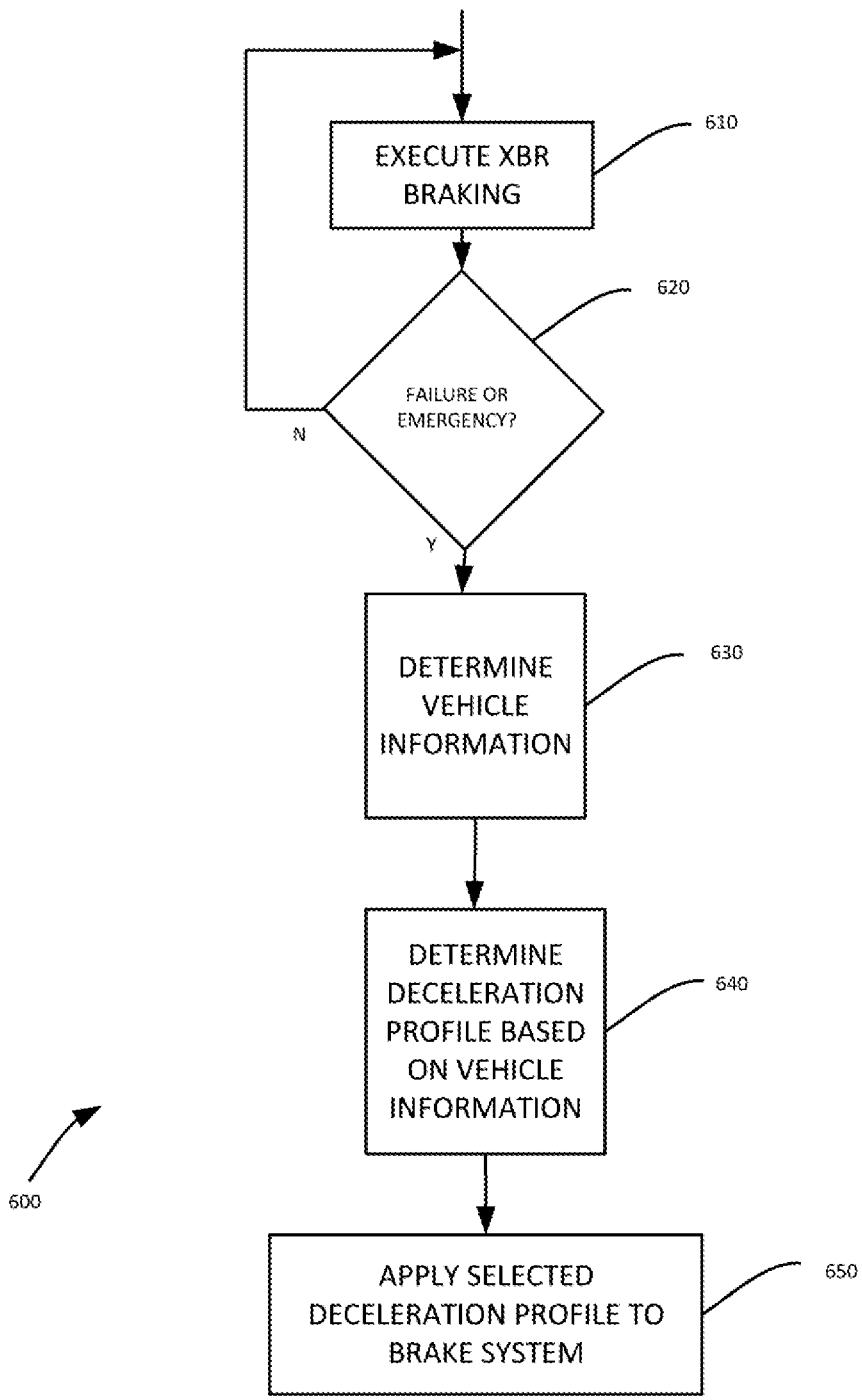
FIG. 6 is a flow diagram of a method using deceleration profiles stored in a brake controller in accordance with an example embodiment.

FIG. 6 is a flow diagram of a method 600 using deceleration profiles stored in a brake controller in accordance with an example embodiment.

With reference now to that Figure, the brake controller 250 controls a braking operation of a braking system of an associated vehicle in step 610 in response to External Brake Request (XBR) deceleration demands received from an associated XBR controlling device in a manner as described above such as for example as shown in FIG. 4. In this regard, the network interface unit of the brake controller is in operative communication with one or more associated XBR controlling devices 121, 131, 141 via an associated control network of the associated vehicle. The network interface unit selectively receives a first XBR deceleration command message from the associated XBR controlling device via the associated control network, wherein the first XBR deceleration command message comprises first XBR deceleration command data representative of a first XBR deceleration command value for decelerating the associated vehicle. The output circuit of the brake controller 250 is operatively coupled with a braking system 320 of the associated vehicle, wherein the output circuit 320 is operative to receive deceleration command data representative of a deceleration command value and to generate a brake command signal corresponding to the deceleration command value on an output of the output circuit for use by the braking system of the associated vehicle to effectuate the braking operation at the deceleration command value.

The brake control unit is operatively coupled with the network interface unit and the output circuit, and includes a processor and a memory device storing a first safe state braking control profile comprising a first set of deceleration data paired with execution time data comprising a first plurality of deceleration data representative of a first plurality of deceleration values paired with a first plurality of execution time increment data representative of a first plurality of execution time increments. In addition, the brake controller includes braking system fault logic, vehicle information logic, and brake control logic stored in the memory device, wherein the braking system fault logic is executable by the processor to determine a fault condition in the associated vehicle such as at step 620, and the vehicle information logic is executable by the processor to determine operational information of the associated vehicle such as at step 630.

The brake control logic stored in the memory device is executable by the processor to communicate in step 610 the first XBR deceleration command data to the output circuit as the deceleration command data, wherein the output circuit generates the brake command signal corresponding to the first XBR deceleration command value on the output circuit for use by the braking system of the associated vehicle to effectuate the braking operation, responsive to the braking system fault logic network interface unit not determining in step 620 the fault condition in the associated vehicle.

The brake control logic stored in the memory device is further executable by the processor to determine a braking control profile in step 640 based on the operational information of the associated vehicle determined by the vehicle information logic executed by the processor such as at step 630.

In accordance with an embodiment, the vehicle information logic of the brake controller is executable by the processor to determine a current level of XBR braking as the operational information of the associated vehicle for example. The brake control logic is executable by the processor responsive to the braking system fault logic network interface unit determining the fault condition in the associated vehicle in step 620 to select in step 640 the first safe state braking control profile based on the current level of XBR braking determined by the vehicle information logic, and communicate the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

In accordance with an embodiment, the vehicle information logic of the brake controller is executable by the processor to determine one or more of a level of XBR controlled braking, a current speed of the vehicle, a distance to the forward vehicle, ABS/WSS health, a forward velocity relative to a vehicle forward to the vehicle of the brake controller 250, a current level of ABS activity, ADAS health, ESP activity as the operational information of the associated vehicle. The brake control logic is executable by the processor responsive to the braking system fault logic network interface unit determining the fault condition in the associated vehicle in step 620 to select in step 640 the first safe state braking control profile based on the one or more of a level of XBR controlled braking, the current speed of the vehicle, the distance to the forward vehicle, the ABS/WSS health, the forward velocity relative to a vehicle forward to the vehicle of the brake controller 250, the current level of ABS activity, the ADAS health, the ESP activity determined by the vehicle information logic, and to communicate the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

Responsive to the braking system fault logic network interface unit determining the fault condition in the associated vehicle in step 620, the brake control logic stored in the memory device is further executable by the processor to select the first safe state braking control profile based on the operational information of the associated vehicle determined by the vehicle information logic in step 630, and to communicate in step 650 the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

In accordance with an embodiment, a brake controller is provided for controlling a braking operation of a braking system of an associated vehicle in response to External Brake Request (XBR) deceleration demands received from an associated XBR controlling device. The brake controller of an example embodiment includes a network interface unit in operative communication with the associated XBR controlling device via an associated control network of the associated vehicle, the network interface unit selectively receiving a first XBR deceleration command message from the associated XBR controlling device via the associated control network, the first XBR deceleration command message comprising first XBR deceleration command data representative of a first XBR deceleration command value for decelerating the associated vehicle.

The brake controller of an example embodiment further includes an output circuit operatively coupled with a braking system of the associated vehicle, the output circuit being operative to receive deceleration command data representative of a deceleration command value and to generate a brake command signal corresponding to the deceleration command value on an output of the output circuit for use by the braking system of the associated vehicle to effectuate the braking operation at the deceleration command value.

The brake controller of an example embodiment further includes a brake control unit operatively coupled with the network interface unit and the output circuit. The brake control unit comprises a processor and a memory device operatively coupled with the processor. The memory device stores vehicle information, braking system fault, and brake control logic, wherein the vehicle information logic is executable by the processor to determine first operational information of the associated vehicle. The braking system fault logic stored in the memory device is executable by the processor to selectively determine a fault condition in the associated vehicle based on a fault occurring in the associated vehicle. The brake control logic stored in the memory device is executable by the processor to, responsive to the braking system fault logic network interface unit not determining the fault condition in the associated vehicle: communicate the first XBR deceleration command data to the output circuit as the deceleration command data, wherein the output circuit generates the brake command signal corresponding to the first XBR deceleration command value on the output circuit for use by the braking system of the associated vehicle to effectuate the braking operation, or responsive to the braking system fault logic network interface unit determining the fault condition in the associated vehicle: based on the first operational information of the associated vehicle determined by the vehicle information logic, determine a first safe state braking control profile comprising first safe state braking control profile data representative of a first safe state braking control profile value for decelerating the associated vehicle; and communicate the first safe state braking control profile data of the first safe state braking control profile to the output circuit as the deceleration command data, wherein the output circuit generates the brake command signal corresponding to the first safe state braking control profile value on the output circuit for use by the braking system of the associated vehicle to effectuate the braking operation in accordance with the determined first safe state braking control profile.

In accordance with an embodiment, the vehicle information logic is executable by the processor to determine one or more of a current level of XBR controlled braking, a current speed of the vehicle, a distance to the forward vehicle, ABS/WSS health, a forward velocity relative to a vehicle forward to the vehicle of the brake controller, a current level of ABS activity, ADAS health, ESP activity as the first operational information of the associated vehicle.

In accordance with an embodiment, the vehicle information logic is executable by the processor to determine second operational information of the associated vehicle, and the brake control logic is executable by the processor to: after communicating the first safe state braking control profile data of the first safe state braking control profile to the output circuit as the deceleration command data: based on a value of the second operational information of the associated vehicle determined by the vehicle information logic, selectively communicate first safe state braking control profile termination data representative of a deceleration termination command value for terminating deceleration of the associated vehicle to the output circuit as the deceleration command data, wherein the output circuit generates a null brake command signal corresponding to the deceleration termination command value on the output circuit for use by the braking system of the associated vehicle to terminate the braking operation.

In accordance with an embodiment, the vehicle information logic is executable by the processor to determine a current level of XBR controlled braking as the first operational information of the associated vehicle, and the vehicle information logic is executable by the processor to determine as the second operational information of the associated vehicle one or more of: a reduction in speed of the associated vehicle relative to a predetermined speed reduction threshold; a speed of the associated vehicle relative to a predetermined vehicle speed threshold; a driver override of the brake controller; a distance to an associated forward vehicle forward of the associated vehicle relative to a predetermined forward distance threshold; and/or a magnitude of relative velocity between the associated vehicle and the associated forward vehicle relative to a predetermined relative velocity threshold.

In accordance with an embodiment, the brake control logic is executable by the processor to, responsive to the braking system fault logic network interface unit determining the fault condition in the associated vehicle, determine the current level of XBR controlled braking to be the first safe state braking control profile.

In accordance with an embodiment, the memory device of the brake control unit stores a first safe state braking control profile comprising a first set of deceleration data paired with execution time data comprising: a first plurality of deceleration data representative of a first plurality of deceleration values paired with a first plurality of execution time increment data representative of a first plurality of execution time increments, wherein the brake control logic is executable by the processor to, responsive to the braking system fault logic network interface unit determining the fault condition in the associated vehicle, selecting the first safe state braking control profile based on the first operational information of the associated vehicle determined by the vehicle information logic, and communicate the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

In accordance with an embodiment, the vehicle information logic is executable by the processor to determine a current level of XBR braking as the first operational information of the associated vehicle, and the brake control logic is executable by the processor to: responsive to the braking system fault logic network interface unit not determining the fault condition in the associated vehicle, communicate the first XBR deceleration command data to the output circuit as the deceleration command data, wherein the output circuit generates the brake command signal corresponding to the first XBR deceleration command value on the output circuit for use by the braking system of the associated vehicle to effectuate the braking operation, or responsive to the braking system fault logic network interface unit determining the fault condition in the associated vehicle, selecting the first safe state braking control profile based on the current level of XBR braking determined by the vehicle information logic, and communicate the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

In accordance with an embodiment, the vehicle information logic is executable by the processor to determine one or more of a level of XBR controlled braking, a current speed of the vehicle, a distance to the forward vehicle, ABS/WSS health, a forward velocity relative to a vehicle forward to the vehicle of the brake controller, a current level of ABS activity, ADAS health, ESP activity as the first operational information of the associated vehicle. In the example embodiment, the brake control logic is executable by the processor to: responsive to the braking system fault logic network interface unit not determining the fault condition in the associated vehicle, communicate the first XBR deceleration command data to the output circuit as the deceleration command data, wherein the output circuit generates the brake command signal corresponding to the first XBR deceleration command value on the output circuit for use by the braking system of the associated vehicle to effectuate the braking operation, or responsive to the braking system fault logic network interface unit determining the fault condition in the associated vehicle, selecting the first safe state braking control profile based on the one or more of a level of XBR controlled braking, a current speed of the vehicle, a distance to the forward vehicle, ABS/WSS health, a forward velocity relative to a vehicle forward to the vehicle of the brake controller 250, a current level of ABS activity, ADAS health, ESP activity determined by the vehicle information logic, and communicate the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

In accordance with an embodiment, the memory device of the brake control unit stores a second braking control profile comprising a second set of deceleration data paired with execution time data comprising: a second plurality of deceleration data representative of a second plurality of deceleration values paired with a second plurality of execution time increment data representative of a second plurality of execution time increments. In the example embodiment, the vehicle information logic is executable by the processor to determine a current level of XBR braking as the first operational information of the associated vehicle. In the example embodiment, the brake control logic is executable by the processor to: responsive to the braking system fault logic network interface unit not determining the fault condition in the associated vehicle, communicate the first XBR deceleration command data to the output circuit as the deceleration command data, wherein the output circuit generates the brake command signal corresponding to the first XBR deceleration command value on the output circuit for use by the braking system of the associated vehicle to effectuate the braking operation, or responsive to the braking system fault logic network interface unit determining the fault condition in the associated vehicle: selecting the first safe state braking control profile based on a first current level of XBR braking determined by the vehicle information logic, and communicate the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile, or selecting the second safe state braking control profile based on a second current level of XBR braking determined by the vehicle information logic, and communicate the second deceleration data of the second safe state braking control profile queued in the memory device to the output circuit as the deceleration command data by communicating the second plurality of deceleration data at the second plurality of execution time increments, wherein the output circuit generates the brake command signal corresponding to the second plurality of deceleration values at the second plurality of execution time increments on the output circuit for use by the braking system of the associated vehicle to effectuate the braking operation in accordance with the second braking control profile.

Figure 7A:
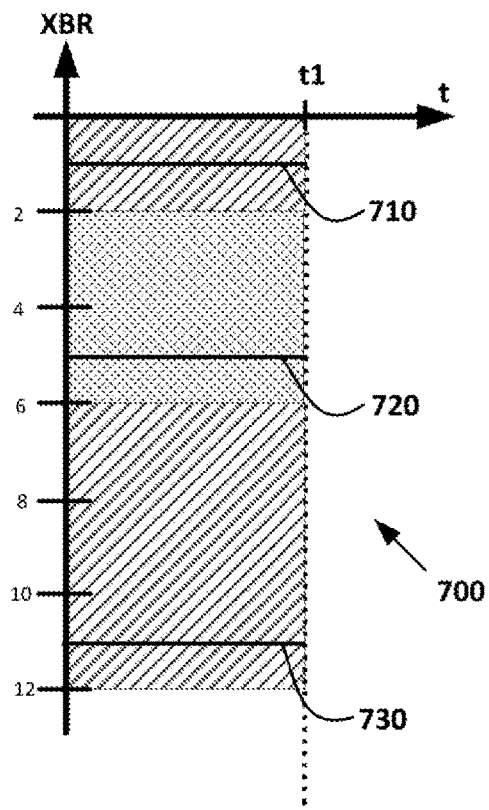
FIG. 7a is a graph showing a set of XBR deceleration curves that may be executed by a vehicle at a time of a fault.

FIG. 7a is a graph showing a set of XBR deceleration curves that may be executed by a vehicle at a time of a fault. In accordance with an embodiment, the vehicle may be executing a first XBR deceleration 710 at a time t1 of a fault. Alternatively in the example, the vehicle may be executing a second XBR deceleration 720 at the time t1 of the fault, or a third XBR deceleration 730 at the time t1 of the fault. Responsive to the braking system fault logic network interface unit determining the fault condition in the associated vehicle in step 620 (FIG. 6), the brake control logic stored in the memory device is executable by the processor to select and/or determine locally a safe state braking control profile 712, 722, 732 based on the operational information of the associated vehicle determined by the vehicle information logic, and to communicate the deceleration data of the selected and/or determined safe state braking control profile 712, 722, 732 to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

Figure 7B:
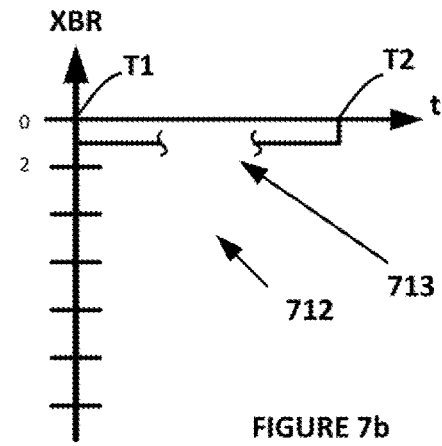
FIGS. 7b-7d are graphs showing possible deceleration profiles may be determined by the brake controller based on a condition of the vehicle including a XBR deceleration curve currently being performed by the vehicle.
Figure 7C:
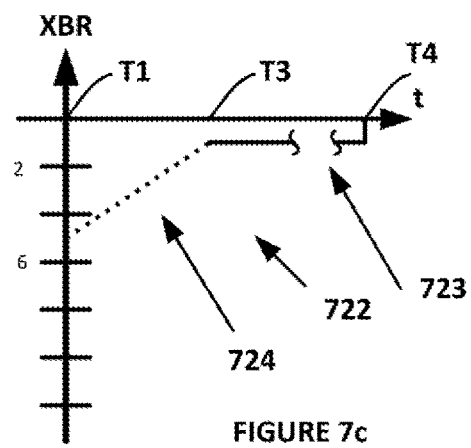
Figure 7D:
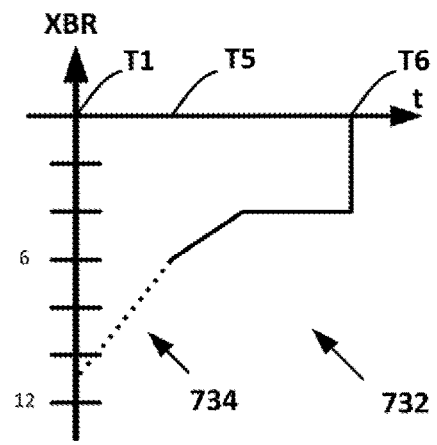

In accordance with an embodiment, the vehicle information logic of the brake controller is executable by the processor to determine a current level 710, 720, or 730 of XBR braking as the operational information of the associated vehicle. FIGS. 7b-7d are graphs showing possible deceleration profiles 712, 722, 732 that may be selected and/or by the brake controller based on the condition of the vehicle including for example the XBR deceleration curve 710, 720, 730 currently being performed by the vehicle. Other operational information of the associated vehicle may be used as well to determine a braking or deceleration profile, wherein the vehicle information logic is executable by the processor to determine one or more of a current level of XBR controlled braking, a current speed of the vehicle, a distance to the forward vehicle, ABS/WSS health, a forward velocity relative to a vehicle forward to the vehicle of the brake controller, a current level of ABS activity, ADAS health, and/or ESP activity as the first operational information of the associated vehicle. Responsive to the braking system fault logic network interface unit determining the fault condition in the associated vehicle, the brake control logic is executable by the processor to, based on the first operational information of the associated vehicle determined by the vehicle information logic, determine a first safe state braking control profile comprising first safe state braking control profile data representative of a first safe state braking control profile value for decelerating the associated vehicle, and communicate the first safe state braking control profile data of the first safe state braking control profile to the output circuit as the deceleration command data, wherein the output circuit generates the brake command signal corresponding to the first safe state braking control profile value on the output circuit for use by the braking system of the associated vehicle to effectuate the braking operation in accordance with the determined first safe state braking control profile.

In the example embodiment, the brake control may determine a first deceleration profile curve 712 or draw a different curve (not shown) from the memory 340 (FIG. 3) for an XBR deceleration operation currently being performed by the from the memory 340 (FIG. 3) vehicle at the time of the fault determination t1 of (0≤XBR<2). The first deceleration profile curve 712 is terminated at T2 based on based on a value of second operational information of the associated vehicle determined by the vehicle information logic. Safe state braking control profile termination data representative of a deceleration termination command value for terminating deceleration of the associated vehicle is communicated to the output circuit as a deceleration command data, wherein the output circuit generates a null brake command signal corresponding to the deceleration termination command value on the output circuit at T2 for use by the braking system of the associated vehicle to terminate the braking operation. In the example embodiment, the vehicle information logic describe above is executable by the processor to determine as the second operational information of the associated vehicle one or more of: a reduction in speed of the associated vehicle relative to a predetermined speed reduction threshold; a speed of the associated vehicle relative to a predetermined vehicle speed threshold; a driver override of the brake controller; a distance to an associated forward vehicle forward of the associated vehicle relative to a predetermined forward distance threshold; and/or a magnitude of relative velocity between the associated vehicle and the associated forward vehicle relative to a predetermined relative velocity threshold. For this reason the determined deceleration profile curve 712 is shown having a gap 713 of indeterminate time.

Similarly in the example embodiment, the brake control may determine a second deceleration profile curve 722 for an XBR deceleration operation currently being performed by the vehicle at the time of the fault determination t1 of (2≤XBR<6). The second deceleration profile curve 722 is terminated at T4 based on based on a value of second operational information of the associated vehicle determined by the vehicle information logic. Safe state braking control profile termination data representative of a deceleration termination command value for terminating deceleration of the associated vehicle is communicated to the output circuit as a deceleration command data, wherein the output circuit generates a null brake command signal corresponding to the deceleration termination command value on the output circuit at T4 for use by the braking system of the associated vehicle to terminate the braking operation. In the example embodiment, the vehicle information logic describe above is executable by the processor to determine as the second operational information of the associated vehicle one or more of: a reduction in speed of the associated vehicle relative to a predetermined speed reduction threshold; a speed of the associated vehicle relative to a predetermined vehicle speed threshold; a driver override of the brake controller; a distance to an associated forward vehicle forward of the associated vehicle relative to a predetermined forward distance threshold; and/or a magnitude of relative velocity between the associated vehicle and the associated forward vehicle relative to a predetermined relative velocity threshold. For this reason the determined deceleration profile curve 722 is shown having a gap 723 of indeterminate time. In addition, the determined deceleration profile curve 722 of the example embodiment is shown having a ramp-in portion 724 for reasons to be described below.

Also similarly in the example embodiment, the brake control may select a third deceleration profile curve 732 from the memory 340 (FIG. 3) for an XBR deceleration operation currently being performed by the vehicle at the time of the fault determination t1 of (6≤XBR≤12). The selected deceleration profile curve 732 of the example embodiment is shown having a ramp-in portion 734 for reasons to be described below.

Braking Profile Priority, Time-Base, and Ramp-In-Rate Characteristics

As shown in Table 1 below, in the example embodiment, each of the plurality braking profiles 330-334 and 350-354 stored in the memory 340 of the braking controller 250 is assigned a Priority for execution relative to other braking profiles stored in the memory 340, a Time-Base for an acceleration/deceleration, and a Ramp-In-Rate during which the brake controller ramps in from an existing XBR demand to a first point in an acceleration table. The arbitration and application logic 360 executing in the brake controller 250 may refer to the Priority assignments for situations when competing XBR controlling devices request different braking profiles. The brake controller 250 may then deliver the selected one of the plurality braking profiles 330-334 and 350-354 to a braking system Electronic Control Unit (ECU) 320 of the associated vehicle. The braking system MCU 320 of the associated vehicle may then apply the braking signals received from the brake controller 250 to brake mechanisms 322, 324, 326, 328 of the associated vehicle.

TABLE 1

Time and priority definition table
Time and Priority Definition Table

| Brake Profile | Profile Execution Name | Priority | Ramp In Rate (Jerk) (m/s/s/s) | Time Base Increment (s) |
|---|---|---|---|---|
| 330 | ACC Wingman-Normal Operation | 6 | 2 | 0.5 |
| 332 | ACC Wingman-Graceful Start | 3 | 1 | 0.5 |
| 334 | ACC Wingman-Graceful Exit | 5 | 1 | 1 |
| 350 | Autonomous Safe State #1 (no nearby cars)1 | 4 | 0.5 | 0.25 |
| 352 | Autonomous Safe State #2 (platooning-following) | 7 | 10 | 0.5 |
| 354 | Autonomous Safe State #3 (platooning-leading) | 8 | 10 | 0.5 |
| 7 | ESP Fault | 2 | 1 | 0.5 |
| 8 | WSS Fault | 1 | 2 | 0.5 |

As shown in Table 1, the one or more XBR controlling devices may select the ACC Normal Operation braking profile 330 when the associated vehicle is operated in an autonomous or in a semi-autonomous mode, wherein the ACC Normal Operation braking profile 330 has a priority assignment value of 6, a ramp-in-rate of 2 m/s/s/s, and a time base of 0.5 sec. Similarly, the ACC Graceful Start braking profile 332 has a priority assignment value of 3, a ramp-in-rate of 1 m/s/s/s, and a time base of 0.5 sec, and the ACC Graceful Exit braking profile 334 has a priority assignment value of 5, a ramp-in-rate of 1 m/s/s/s, and a time base of 1.0 sec.

In the example embodiment, the arbitration and application logic 360 is executable by the processor of the brake controller 250 to arbitrate between the various braking profiles 330, 332, 334 when more than one are selected, and when a second braking profile is requested by an XBR controlling device before a first earlier-requested braking profile having a lower Priority level than the second braking profile has had a chance to complete. The arbitration is based on the priority values assigned to the profiles wherein a lower priority value is selected by the brake controller 250 over profiles having higher priority values. By way of example, the ACC Graceful Start braking profile 332 has a priority assignment value of 3 and is selected by the arbitration and application logic 360 over the ACC Normal Operation braking profile 330 having a priority assignment value of 6 when both are requested by the various XBR requesting devices of the vehicle. The ACC Graceful Start braking profile 332 is then applied by the arbitration and application logic 360 to the braking system MCU 320 of the associated vehicle.

In further addition to the above, the arbitration and application logic 360 is executable by the processor of the brake controller 250 to ramp in different selected braking profiles when the XBR requesting devices of the vehicle request different braking profiles in succession, and when a second braking profile is requested by an XBR controlling device before a first earlier-requested braking profile having a lower Priority level than the second braking profile has had a chance to complete. By way of example, if the ACC Normal Operation braking profile 330 is being executed by the brake controller 250 delivering to the braking system MCU 320 of the associated vehicle the ACC Normal Operation braking profile 330 having a priority assignment value of 6, and the brake controller receives a braking profile request message from one of the XBR requesting devices requesting the ACC Graceful Start braking profile 332 having the priority assignment value of 3, the arbitration and application logic 360 selects the ACC Graceful Start braking profile 332 having the priority assignment value of 3 for delivery to the braking system MCU 320, and the arbitration and application logic 360 will also ramp in the ACC Graceful Start braking profile 332 using the Ramp In Rate of the ACC Graceful Start braking profile 332; namely 1 m/s/s/s as shown in the Table 1 above. This allows for varying length and reaction of deceleration demands for limited number of table points. Upon loss of signal/failure the device active and priority would be used to determine the reaction. For example, if two XBR Demands are active and the one with a lower priority number (more important) would define the profile. The final value at the end of the table command would be 0 m/s/s.

As described above, in the example embodiment, each of the plurality braking profiles 330-334 and 350-354 are stored in the memory 340 of the braking controller 250. In the example embodiment, each of the safe state deceleration profiles specifies a set of deceleration data paired with execution time data comprising a first plurality of deceleration data representative of a first plurality of deceleration values paired with a first plurality of execution time increment data representative of a first plurality of execution time increments to be followed by the brake controller 250 for generating brake signals 252 to be sent to a braking system Electronic Control Unit (ECU) 320 of the associated vehicle. Table 2 below illustrates deceleration and execution time pairings in accordance with an example embodiment.

TABLE 2

XBR Acceleration Table
XBR Acceleration Table

| Failure Profile | 330 | 332 | 334 | 350 | 352 | 354 | 7 | 8 |
|---|---|---|---|---|---|---|---|---|
| Decel Value 1 | −4 | −4 | −2 | −10 | 0 | 0 | −3 | −1.5 |
| Decel value 2 | −3 | −3.5 | −2.5 | −10 | 0 | 0 | −3 | −1.5 |
| Decel value 3 | −2 | −3 | −3.5 | −10 | 0 | 0 | −3 | −1.5 |
| Decel value 4 | −1 | −3 | −4 | −10 | 0 | 0 | −3 | −1.5 |
| Decel value 5 | 0 | −3 | −4 | −10 | 0 | 0 | −2.5 | −1.5 |
| Decel value 6 | 0 | −3 | −4 | −10 | 0 | 0 | −2.5 | −1.5 |
| Decel value 7 | 0 | −3 | −2 | −10 | 0 | 0 | −2.5 | −1.5 |
| Decel value 8 | 0 | −3 | 0 | −6 | 0 | 0 | −2.5 | −1.5 |
| Decel value 9 | 0 | −3 | 0 | −6 | 0 | 0 | −2.5 | −1.5 |
| Decel value 10 | 0 | −3 | 0 | −6 | 0 | 0 | −2.5 | −1.5 |
| Decel value 11 | 0 | −3 | 0 | −6 | 0 | 0 | −2.5 | −1.5 |
| Decel value 12 | 0 | −3 | 0 | −5 | 0 | 0 | −2.5 | −1.5 |
| Decel value 13 | 0 | −3 | 0 | −4 | 0 | 0 | −2.5 | −1.5 |
| Decel value 14 | 0 | −3 | 0 | −3 | 0 | 0 | −2.5 | −1.5 |
| Decel value 15 | 0 | −3 | 0 | −1.5 | 0 | 0 | −2.5 | −1.5 |
| Decel Value 16 | 0 | −3 | 0 | 0 | 0 | 0 | −2.5 | −1.5 |

Figure 8:
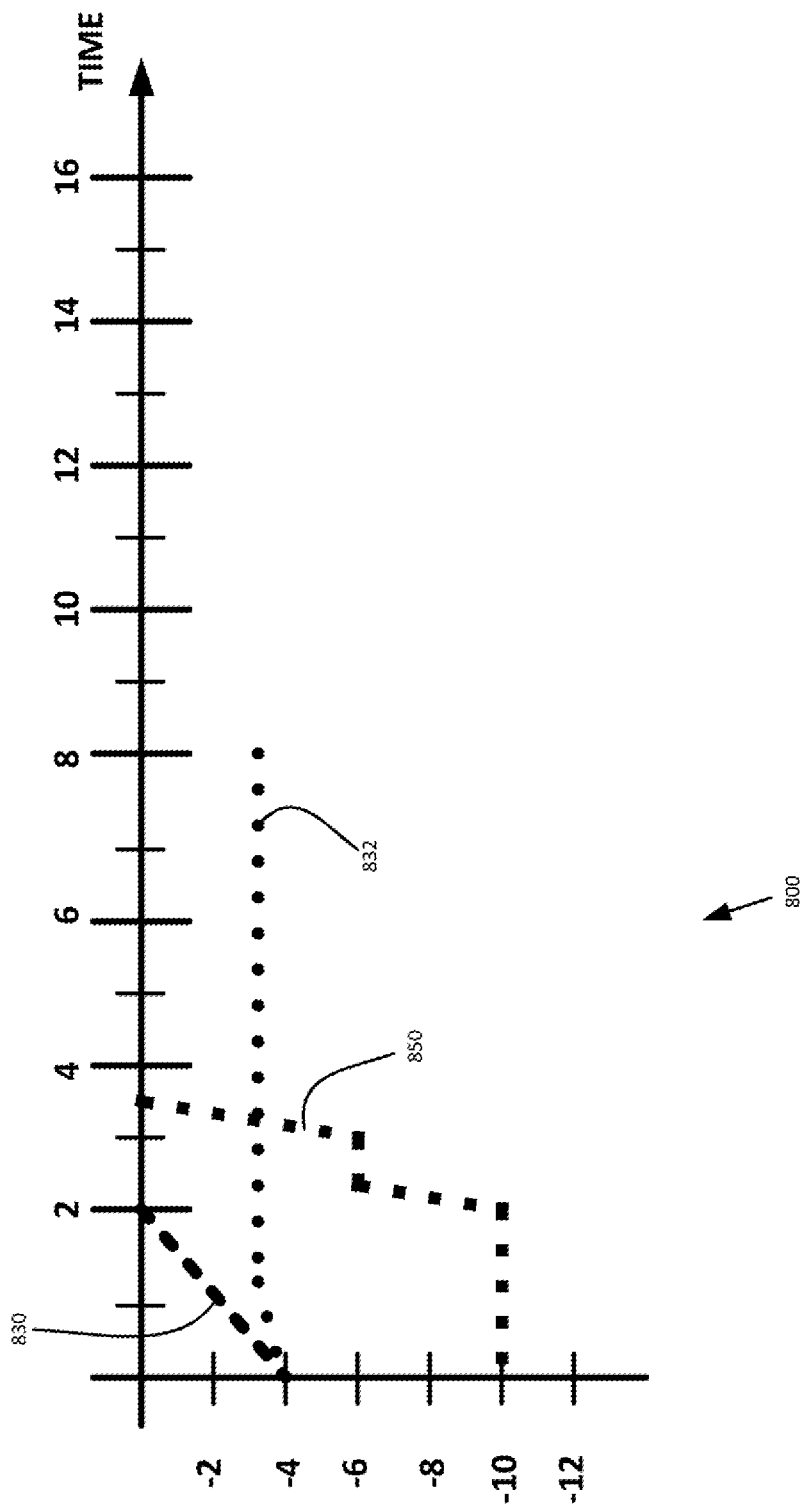
FIG. 8 is an illustration of a deceleration graph showing representative deceleration profiles in accordance with an example embodiment.

FIG. 8 is an illustration of a deceleration graph 800 showing representative deceleration profiles in accordance with an example embodiment. As described above, in the example embodiment, each of the plurality braking profiles 330-334 and 350-354 are stored in the memory 340 of the braking controller 250. In the example embodiment, each of the safe state deceleration profiles specifies a set of deceleration data paired with execution time data comprising a first plurality of deceleration data representative of a first plurality of deceleration values paired with a first plurality of execution time increment data representative of a first plurality of execution time increments to be followed by the brake controller 250 for generating brake signals 252 to be sent to a braking system Electronic Control Unit (ECU) 320 of the associated vehicle.

A first deceleration curve 830 in the deceleration graph 800 is representative of the ACC Normal Operation braking profile 330 being executed by the brake controller 250 delivering to the braking system MCU 320 of the associated vehicle. From Table 1 and Table 2 it can be seen that the ACC Normal Operation braking profile 330 has a Time Base Increment of 0.5 and issues deceleration level commands in the 0.5 second increments to the braking system MCU 320 in a sequence of −4, −3, −2, and −1.

A second deceleration curve 832 in the deceleration graph 800 is representative of the ACC Graceful Start braking profile 332 being executed by the brake controller 250 delivering to the braking system MCU 320 of the associated vehicle. From Table 1 and Table 2 it can be seen that the ACC Graceful Start braking profile 332 has a Time Base Increment of 0.5 and issues deceleration level commands in the 0.5 second increments to the braking system MCU 320 in a sequence of −4, −3.5, −3, −3, −3, −3, −3, etc.

A third deceleration curve 850 in the deceleration graph 800 is representative of the Autonomous Safe State #1 (no nearby cars) profile 350 being executed by the brake controller 250 delivering to the braking system MCU 320 of the associated vehicle. From Table 1 and Table 2 it can be seen that the Autonomous Safe State #1 (no nearby cars) profile 350 has a Time Base Increment of 0.25 and issues deceleration level commands in the 0.25 second increments to the braking system MCU 320 in a sequence of −10, −10, −10, −10, −10, −10, −10, −6, −6, −6, −6, −5, −4, −3, etc.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A brake controller controlling a braking operation of a braking system of an associated vehicle in response to External Brake Request (XBR) deceleration demands received from an associated XBR controlling device, the brake controller comprising:
   a network interface device in operative communication with the associated XBR controlling device via an associated control network of the associated vehicle, the network interface device selectively receiving a first XBR deceleration profile selection message from the associated XBR controlling device via the associated control network;
   an output circuit operatively coupled with a braking system of the associated vehicle, the output circuit being operative to receive deceleration command data representative of a deceleration command value and to generate a brake command signal corresponding to the deceleration command value on an output of the output circuit for use by the braking system of the associated vehicle to effectuate the braking operation at the deceleration command value; and a brake control device operatively coupled with the network interface device and the output circuit, the brake control device comprising:
  a processor;
  a memory device storing a plurality of braking control profiles comprising deceleration profile data representative of deceleration profile values; and
  brake control logic stored in the memory device, the brake control logic being executable by the processor to, responsive to the network interface device receiving the first XBR deceleration profile selection message:
    decode the first XBR deceleration profile selection message to determine a first braking profile selection signal selecting a first braking control profile of the plurality of braking control profiles by the first XBR deceleration profile selection message, wherein the selected first braking control profile comprises first deceleration profile data representative of a first deceleration profile value; and
    communicate the first deceleration profile data to the output circuit as the deceleration command data, wherein the output circuit generates the brake command signal corresponding to the first deceleration profile value for use by the braking system of the associated vehicle to effectuate the braking operation in accordance with the first braking control profile.

2. The brake controller according to claim 1, wherein:
the first braking control profile of the plurality of braking control profiles stored in the memory device comprises ramp-in data representative of a maximum rate of deceleration change for initiating the first braking control profile by the brake control logic relative to a braking control currently being executed by the brake control logic;
the brake control logic communicates the first deceleration data to the output circuit as the deceleration command data by:
  adjusting the braking control currently being executed in increments of the ramp-in data, communicating the adjusted braking control currently being executed to the output circuit as the deceleration command data until the adjusted braking control currently being executed matches the first deceleration data, then communicating the second deceleration data to the output circuit as the deceleration command data.

3. The brake controller according to claim 1, wherein:
the first braking control profile of the plurality of braking control profiles stored in the memory device of the brake control device comprises:
  a first set of deceleration data paired with execution time data comprising:
    a first plurality of deceleration data representative of a first plurality of deceleration values paired with a first plurality of execution time increment data representative of a first plurality of execution time increments;
the brake control logic stored in the memory device of the brake control device is executable by the processor to, responsive to the network interface device receiving the first XBR deceleration profile selection message:
  communicate the first deceleration data to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

4. The brake controller according to claim 3, wherein:
the plurality of braking control profiles stored in the memory device of the brake control device comprises:
  a second braking control profile comprising a second set of deceleration data paired with execution time data comprising:
    a second plurality of deceleration data representative of a second plurality of deceleration values paired with a second plurality of execution time increment data representative of a second plurality of execution time increments;
the brake control logic is executable by the processor to, responsive to the network interface device receiving a second XBR deceleration profile selection message:
  decode the second XBR deceleration profile selection message to determine a second braking profile selection signal selecting the second braking control profile by the second deceleration trigger message; and
  communicate the second deceleration data to the output circuit as the deceleration command data by communicating the second plurality of deceleration data at the second plurality of execution time increments, wherein the output circuit generates the brake command signal corresponding to the second plurality of deceleration values at the second plurality of execution time increments on the output circuit for use by the braking system of the associated vehicle to effectuate the braking operation in accordance with the second braking control profile.

5. The brake controller according to claim 4, wherein:
the first braking control profile of the plurality of braking control profiles stored in the memory device comprises a first priority value;
the second braking control profile of the plurality of braking control profiles stored in the memory device comprises a second priority value;
the memory device of the brake control device stores arbitration logic executable by the processor to determine a rank between the first and second priority values; and
the brake control logic is executable by the processor to:
  responsive to the arbitration logic determining the first priority value being ranked above the second priority value, communicate the first deceleration data to the output circuit as the deceleration command data, or
  responsive to the arbitration logic determining the second priority value being ranked above the first priority value, communicate the second deceleration data to the output circuit as the deceleration command data.

6. A brake controller controlling a braking operation of a braking system of an associated vehicle in response to External Brake Request (XBR) deceleration demands received from an associated XBR controlling device, the brake controller comprising:

a network interface device in operative communication with the associated XBR controlling device via an associated control network of the associated vehicle, the network interface device selectively receiving a first safe state deceleration profile selection message from the associated XBR controlling device via the associated control network;

an output circuit operatively coupled with a braking system of the associated vehicle, the output circuit being operative to receive deceleration command data representative of a deceleration command value and to generate a brake command signal corresponding to the deceleration command value on an output of the output circuit for use by the braking system of the associated vehicle to effectuate the braking operation at the deceleration command value; and a brake control device operatively coupled with the network interface device and the output circuit, the brake control device comprising:
  a memory device storing a plurality of safe state braking control profiles comprising safe state braking control profile data representative of safe state braking control profile values;
  a processor;
  braking system fault logic stored in the memory device, the braking system fault logic being executable by the processor to determine a fault in the associated vehicle; and
  brake control logic stored in the memory device, the brake control logic being executable by the processor to, responsive to the network interface device receiving the first safe state deceleration profile selection message:
    decode the first safe state deceleration profile selection message to determine a first safe state braking profile selection signal selecting a first safe state braking control profile of the plurality of safe state braking control profiles by the first safe state deceleration profile selection message, wherein the selected first safe state braking control profile comprises first safe state braking control profile data representative of a first safe state braking control profile value; and
    queue in the memory device the first safe state braking control profile selected by the first safe state braking profile selection signal;
  wherein the brake control logic is operable to:
    responsive to the braking system fault logic determining the fault in the associated vehicle, communicate the first deceleration data of the first safe state braking control profile queued in the memory device to the output circuit as the deceleration command data, wherein the output circuit generates the brake command signal corresponding to the first safe state braking control profile value on the output circuit for use by the braking system of the associated vehicle to effectuate the braking operation in accordance with the first safe state braking control profile.

7. The brake controller according to claim 6, wherein:
the first safe state braking control profile of the plurality of safe state braking control profiles stored in the memory device comprises ramp-in data representative of a maximum rate of deceleration change for initiating the first braking control profile by the brake control logic relative to a braking control currently being executed by the brake control logic;

the brake control logic communicates the first deceleration data to the output circuit as the deceleration command data by:
  adjusting the braking control currently being executed in increments of the ramp-in data, communicating the adjusted braking control currently being executed to the output circuit as the deceleration command data until the adjusted braking control currently being executed matches the first deceleration data, then communicating the second deceleration data to the output circuit as the deceleration command data.

8. The brake controller according to claim 6, wherein:
the first safe state braking control profile of the plurality of safe state braking control profiles stored in the memory device of the brake control device comprises:
  a first set of deceleration data paired with execution time data comprising:
    a first plurality of deceleration data representative of a first plurality of deceleration values paired with a first plurality of execution time increment data representative of a first plurality of execution time increments; and
the brake control logic stored in the memory device of the brake control device is operable to:
  responsive to the braking system fault logic determining the fault in the associated vehicle, communicate the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

9. The brake controller according to claim 8, wherein:
the plurality of safe state braking control profiles stored in the memory device of the brake control device comprises:
  a second braking control profile comprising a second set of deceleration data paired with execution time data comprising:
    a second plurality of deceleration data representative of a second plurality of deceleration values paired with a second plurality of execution time increment data representative of a second plurality of execution time increments;
the brake control logic is executable by the processor to, responsive to the network interface device receiving a second safe state deceleration profile selection message:
  decode the second safe state deceleration profile selection message to determine a second braking profile selection signal selecting the second braking control profile by the second deceleration trigger message; and
  communicate the second deceleration data to the output circuit as the deceleration command data by communicating the second plurality of deceleration data at the second plurality of execution time increments, wherein the output circuit generates the brake command signal corresponding to the second plurality of deceleration values at the second plurality of execution time increments on the output circuit for use by the braking system of the associated vehicle to effectuate the braking operation in accordance with the second braking control profile.

10. The brake controller according to claim 9, wherein:
the first braking control profile of the plurality of safe state braking control profiles stored in the memory device comprises a first priority value;
the second braking control profile of the plurality of safe state braking control profiles stored in the memory device comprises a second priority value;
the memory device of the brake control device stores arbitration logic executable by the processor to determine a rank between the first and second priority values; and
the brake control logic is executable by the processor to:
responsive to the arbitration logic determining the first priority value being ranked above the second priority value, communicate the first deceleration data to the output circuit as the deceleration command data, or
responsive to the arbitration logic determining the second priority value being ranked above the first priority value, communicate the second deceleration data to the output circuit as the deceleration command data.

11. A brake controller controlling a braking operation of a braking system of an associated vehicle in response to External Brake Request (XBR) deceleration demands received from an associated XBR controlling device, the brake controller comprising:
a network interface device in operative communication with the associated XBR controlling device via an associated control network of the associated vehicle, the network interface device selectively receiving a first XBR deceleration command message from the associated XBR controlling device via the associated control network, the first XBR deceleration command message comprising first XBR deceleration command data representative of a first XBR deceleration command value for decelerating the associated vehicle;
an output circuit operatively coupled with a braking system of the associated vehicle, the output circuit being operative to receive deceleration command data representative of a deceleration command value and to generate a brake command signal corresponding to the deceleration command value on an output of the output circuit for use by the braking system of the associated vehicle to effectuate the braking operation at the deceleration command value; and
a brake control device operatively coupled with the network interface device and the output circuit, the brake control device comprising:
a processor;
a memory device operatively coupled with the processor;
vehicle information logic stored in the memory device, the vehicle information logic being executable by the processor to determine first operational information of the associated vehicle;
a plurality of safe state braking control profiles stored in the memory device, the plurality of safe state braking control profiles comprising safe state braking control profile data representative of safe state braking control profile values;
braking system fault logic stored in the memory device, the braking system fault logic being executable by the processor to selectively determine a fault condition in the associated vehicle based on a fault occurring in the associated vehicle; and
brake control logic stored in the memory device, the brake control logic being executable by the processor to:
responsive to the braking system fault logic network interface device determining the fault condition in the associated vehicle:
based on the first operational information of the associated vehicle determined by the vehicle information logic, determine a first safe state braking control profile of the plurality of safe state braking control profiles stored in the memory device, the determined first safe state braking control profile comprising first safe state braking control profile data representative of a first safe state braking control profile value for decelerating the associated vehicle; and
communicate the first safe state braking control profile data of the first safe state braking control profile to the output circuit as the deceleration command data, wherein the output circuit generates the brake command signal corresponding to the first safe state braking control profile value on the output circuit for use by the braking system of the associated vehicle to effectuate the braking operation in accordance with the determined first safe state braking control profile.

12. The brake controller according to claim 11, wherein:
the vehicle information logic is executable by the processor to determine one or more of a current level of XBR controlled braking, a current speed of the vehicle, a distance to an associated forward vehicle forward of the associated vehicle, ABS/WSS health, a forward velocity relative to a vehicle forward to the vehicle of the brake controller, a current level of ABS activity, ADAS health, ESP activity as the first operational information of the associated vehicle.

13. The brake controller according to claim 11, wherein:
the vehicle information logic is executable by the processor to determine second operational information of the associated vehicle;
the brake control logic is executable by the processor to:
after communicating the first safe state braking control profile data of the first safe state braking control profile to the output circuit as the deceleration command data:
based on a value of the second operational information of the associated vehicle determined by the vehicle information logic, selectively communicate first safe state braking control profile termination data representative of a deceleration termination command value for terminating deceleration of the associated vehicle to the output circuit as the deceleration command data, wherein the output circuit generates a null brake command signal corresponding to the deceleration termination command value on the output circuit for use by the braking system of the associated vehicle to terminate the braking operation.

14. The brake controller according to claim 13, wherein:
the vehicle information logic is executable by the processor to determine a current level of XBR controlled braking as the first operational information of the associated vehicle; and the vehicle information logic is executable by the processor to determine as the second operational information of the associated vehicle one or more of:
  a reduction in speed of the associated vehicle relative to a predetermined speed reduction threshold;
  a speed of the associated vehicle relative to a predetermined vehicle speed threshold;
  a driver override of the brake controller;
  a distance to an associated forward vehicle forward of the associated vehicle relative to a predetermined forward distance threshold; and/or
  a magnitude of relative velocity between the associated vehicle and the associated forward vehicle relative to a predetermined relative velocity threshold.

15. The brake controller according to claim 14, wherein:
the brake control logic is executable by the processor to, responsive to the braking system fault logic network interface device determining the fault condition in the associated vehicle, determine the current level of XBR controlled braking to be the first safe state braking control profile.

16. The controller according to claim 11, wherein:
the first safe state braking control profile stored in the memory device of the brake control device comprises:
  a first set of deceleration data paired with execution time data comprising:
    a first plurality of deceleration data representative of a first plurality of deceleration values paired with a first plurality of execution time increment data representative of a first plurality of execution time increments;
the brake control logic is executable by the processor to:
  responsive to the braking system fault logic network interface device determining the fault condition in the associated vehicle, selecting the first safe state braking control profile based on the first operational information of the associated vehicle determined by the vehicle information logic, and communicate the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

17. The brake controller according to claim 16, wherein:
the vehicle information logic is executable by the processor to determine a current level of XBR braking as the first operational information of the associated vehicle; and
the brake control logic is executable by the processor to:
  responsive to the braking system fault logic network interface device not determining the fault condition in the associated vehicle, communicate the first XBR deceleration command data to the output circuit as the deceleration command data, wherein the output circuit generates the brake command signal corresponding to the first XBR deceleration command value on the output circuit for use by the braking system of the associated vehicle to effectuate the braking operation, or
  responsive to the braking system fault logic network interface device determining the fault condition in the associated vehicle, selecting the first safe state braking control profile based on the current level of XBR braking determined by the vehicle information logic, and communicate the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

18. The brake controller according to claim 16 wherein:
the vehicle information logic is executable by the processor to determine one or more of a level of XBR controlled braking, a current speed of the vehicle, a distance to an associated forward vehicle forward of the associated vehicle, ABS/WSS health, a forward velocity relative to a vehicle forward to the vehicle of the brake controller, a current level of ABS activity, ADAS health, ESP activity as the first operational information of the associated vehicle; and
the brake control logic is executable by the processor to:
  responsive to the braking system fault logic network interface device not determining the fault condition in the associated vehicle, communicate the first XBR deceleration command data to the output circuit as the deceleration command data, wherein the output circuit generates the brake command signal corresponding to the first XBR deceleration command value on the output circuit for use by the braking system of the associated vehicle to effectuate the braking operation, or
  responsive to the braking system fault logic network interface device determining the fault condition in the associated vehicle, selecting the first safe state braking control profile based on the one or more of a level of XBR controlled braking, a current speed of the vehicle, a distance to the forward vehicle, ABS/WSS health, a forward velocity relative to a vehicle forward to the vehicle of the brake controller 250, a current level of ABS activity, ADAS health, ESP activity determined by the vehicle information logic, and communicate the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile.

19. The brake controller according to claim 16, wherein:
the plurality of safe state braking control profiles stored in the memory device of the brake control device comprises:
  a second braking control profile comprising a second set of deceleration data paired with execution time data comprising:

a second plurality of deceleration data representative of a second plurality of deceleration values paired with a second plurality of execution time increment data representative of a second plurality of execution time increments;

the vehicle information logic is executable by the processor to determine a current level of XBR braking as the first operational information of the associated vehicle; and the brake control logic is executable by the processor to:
responsive to the braking system fault logic network interface device not determining the fault condition in the associated vehicle, communicate the first XBR deceleration command data to the output circuit as the deceleration command data, wherein the output circuit generates the brake command signal corresponding to the first XBR deceleration command value on the output circuit for use by the braking system of the associated vehicle to effectuate the braking operation, or responsive to the braking system fault logic network interface device determining the fault condition in the associated vehicle:
selecting the first safe state braking control profile based on a first current level of XBR braking determined by the vehicle information logic, and communicate the first deceleration data of the first safe state braking control profile queued in the memory device to the output circuit as the deceleration command data by communicating the first plurality of deceleration data at the first plurality of execution time increments, wherein the output circuit generates the brake command signal corresponding to the first plurality of deceleration values at the first plurality of execution time increments on the output circuit for use by the braking system of the associated vehicle to effectuate the braking operation in accordance with the first braking control profile, or selecting the second safe state braking control profile based on a second current level of XBR braking determined by the vehicle information logic, and communicate the second deceleration data of the second safe state braking control profile queued in the memory device to the output circuit as the deceleration command data by communicating the second plurality of deceleration data at the second plurality of execution time increments, wherein the output circuit generates the brake command signal corresponding to the second plurality of deceleration values at the second plurality of execution time increments on the output circuit for use by the braking system of the associated vehicle to effectuate the braking operation in accordance with the second braking control profile.

* * * * *